(12) United States Patent
Mullen et al.

(10) Patent No.: US 12,361,463 B1
(45) Date of Patent: Jul. 15, 2025

(54) POWERED CARDS AND DEVICES DESIGNED, PROGRAMMED, AND DEPLOYED FROM A KIOSK

(71) Applicants: Jeffrey D. Mullen, Pittsburgh, PA (US); Michael T. Wallace, Payson, AZ (US)

(72) Inventors: Jeffrey D. Mullen, Pittsburgh, PA (US); Michael T. Wallace, Payson, AZ (US)

(73) Assignee: Dynamics Inc., Cheswick, PA (US)

( * ) Notice: Subject to any disclaimer, the term of this patent is extended or adjusted under 35 U.S.C. 154(b) by 0 days.

(21) Appl. No.: 13/889,065

(22) Filed: May 7, 2013

Related U.S. Application Data

(63) Continuation of application No. 13/277,309, filed on Oct. 20, 2011, now Pat. No. 8,561,894.

(60) Provisional application No. 61/394,959, filed on Oct. 20, 2010.

(51) Int. Cl.
*G06Q 30/06* (2023.01)
*G06Q 30/0601* (2023.01)

(52) U.S. Cl.
CPC .................. *G06Q 30/0621* (2013.01)

(58) Field of Classification Search
CPC .................................. G06Q 30/0621
USPC .................... 235/381; 700/117, 223
See application file for complete search history.

(56) References Cited

U.S. PATENT DOCUMENTS

| | | | |
|---|---|---|---|
| 4,353,064 A | 10/1982 | Stamm | |
| 4,394,654 A | 7/1983 | Hofmann-Cerfontaine | |
| 4,614,861 A | 9/1986 | Pavlov et al. | |
| 4,667,087 A | 5/1987 | Quintana | |
| 4,701,601 A | 10/1987 | Francini et al. | |
| 4,720,860 A | 1/1988 | Weiss | |
| 4,786,791 A | 11/1988 | Hodama | |
| 4,791,283 A | 12/1988 | Burkhardt | |
| 4,797,542 A | 1/1989 | Hara | |
| 4,968,873 A | 11/1990 | Dethloff et al. | |
| 5,038,251 A | 8/1991 | Sugiyama et al. | |
| 5,168,520 A | 12/1992 | Weiss | |
| 5,237,614 A | 8/1993 | Weiss | |
| 5,276,311 A | 1/1994 | Hennige | |
| 5,347,580 A | 9/1994 | Molva et al. | |
| 5,361,062 A | 11/1994 | Weiss et al. | |
| 5,412,189 A | 5/1995 | Cragun | |

(Continued)

OTHER PUBLICATIONS

U.S. Appl. No. 60/594,300, Poidomani et al.

(Continued)

*Primary Examiner* — Daniel A Hess
(74) *Attorney, Agent, or Firm* — Morris Law Group; Robert W. Morris

(57) ABSTRACT

A kiosk may be provided that contains a number of blank cards. A graphical user interface of the kiosk may allow a user to define products that may be associated with a blank card contained within the kiosk. Aesthetic and functional features may be applied to a blank card by a kiosk and dispensed to a user of the kiosk as a fully functional card. An interrogation device of a kiosk may retrieve products associated with a current card and may associate the retrieved products with a new card to be dispensed from the kiosk. A kiosk may access a network to preauthorize any products that may be associated with a card dispensed from or programmed by the kiosk.

22 Claims, 30 Drawing Sheets

(56) References Cited

U.S. PATENT DOCUMENTS

| | | |
|---|---|---|
| 5,412,199 A | 5/1995 | Finkelstein et al. |
| 5,434,398 A | 7/1995 | Goldberg |
| 5,434,405 A | 7/1995 | Finkelstein et al. |
| 5,478,994 A | 12/1995 | Rahman |
| 5,479,512 A | 12/1995 | Weiss |
| 5,484,997 A | 1/1996 | Haynes |
| 5,485,519 A | 1/1996 | Weiss |
| 5,585,787 A | 12/1996 | Wallerstein |
| 5,591,949 A | 1/1997 | Bernstein |
| 5,608,203 A | 3/1997 | Finkelstein et al. |
| 5,615,123 A * | 3/1997 | Davidson et al. ............ 700/233 |
| 5,623,552 A | 4/1997 | Lane |
| 5,657,388 A | 8/1997 | Weiss |
| 5,834,747 A | 11/1998 | Cooper |
| 5,834,756 A | 11/1998 | Gutman et al. |
| 5,856,661 A | 1/1999 | Finkelstein et al. |
| 5,864,623 A | 1/1999 | Messina et al. |
| 5,907,142 A | 5/1999 | Kelsey |
| 5,913,203 A | 6/1999 | Wong et al. |
| 5,937,394 A | 8/1999 | Wong et al. |
| 5,949,688 A * | 9/1999 | Montoya ................ G06Q 30/06 700/235 |
| 5,955,021 A | 9/1999 | Tiffany, III |
| 5,956,699 A | 9/1999 | Wong et al. |
| 6,025,054 A | 2/2000 | Tiffany, III |
| 6,045,043 A | 4/2000 | Bashan et al. |
| 6,076,163 A | 6/2000 | Hoffstein et al. |
| 6,085,320 A | 7/2000 | Kaliski |
| 6,095,416 A | 8/2000 | Grant et al. |
| 6,130,621 A | 10/2000 | Weiss |
| 6,145,079 A | 11/2000 | Mitty et al. |
| 6,157,920 A | 12/2000 | Jakobsson et al. |
| 6,161,181 A | 12/2000 | Haynes, III et al. |
| 6,176,430 B1 | 1/2001 | Finkelstein et al. |
| 6,182,894 B1 | 2/2001 | Hackett et al. |
| 6,189,098 B1 | 2/2001 | Kaliski |
| 6,199,052 B1 | 3/2001 | Mitty et al. |
| 6,206,293 B1 | 3/2001 | Gutman et al. |
| 6,240,184 B1 | 5/2001 | Huynh et al. |
| 6,241,153 B1 | 6/2001 | Tiffany, III |
| 6,243,687 B1 | 6/2001 | Powell |
| 6,256,873 B1 | 7/2001 | Tiffany, III |
| 6,269,163 B1 | 7/2001 | Rivest et al. |
| 6,286,022 B1 | 9/2001 | Kaliski et al. |
| 6,308,890 B1 | 10/2001 | Cooper |
| 6,313,724 B1 | 11/2001 | Osterweil |
| 6,389,442 B1 | 5/2002 | Yin et al. |
| 6,393,447 B1 | 5/2002 | Jakobsson et al. |
| 6,411,715 B1 | 6/2002 | Liskov et al. |
| 6,446,052 B1 | 9/2002 | Juels |
| 6,460,141 B1 | 10/2002 | Olden |
| 6,473,666 B1 * | 10/2002 | Samura ........................ 700/117 |
| 6,592,044 B1 | 7/2003 | Wong et al. |
| 6,607,127 B2 | 8/2003 | Wong |
| 6,609,654 B1 | 8/2003 | Anderson et al. |
| 6,631,849 B2 | 10/2003 | Blossom |
| 6,655,585 B2 | 12/2003 | Shinn |
| 6,681,988 B2 | 1/2004 | Stack et al. |
| 6,705,520 B1 | 3/2004 | Pitroda et al. |
| 6,755,341 B1 | 6/2004 | Wong et al. |
| 6,764,005 B2 | 7/2004 | Cooper |
| 6,769,618 B1 | 8/2004 | Finkelstein |
| 6,805,288 B2 | 10/2004 | Routhenstein et al. |
| 6,811,082 B2 | 11/2004 | Wong |
| 6,813,354 B1 | 11/2004 | Jakobsson et al. |
| 6,817,532 B2 | 11/2004 | Finkelstein |
| 6,873,974 B1 | 3/2005 | Schutzer |
| 6,902,116 B2 | 6/2005 | Finkelstein |
| 6,957,125 B1 * | 10/2005 | Rifkin ..................... G07F 17/26 221/3 |
| 6,970,070 B2 | 11/2005 | Juels et al. |
| 6,980,969 B1 | 12/2005 | Tuchler et al. |
| 6,985,583 B1 | 1/2006 | Brainard et al. |
| 6,991,155 B2 | 1/2006 | Burchette, Jr. |
| 7,013,030 B2 | 3/2006 | Wong et al. |
| 7,035,443 B2 | 4/2006 | Wong |
| 7,039,223 B2 | 5/2006 | Wong |
| 7,044,394 B2 | 5/2006 | Brown |
| 7,051,929 B2 | 5/2006 | Li |
| 7,083,094 B2 | 8/2006 | Cooper |
| 7,100,049 B2 | 8/2006 | Gasparini et al. |
| 7,100,821 B2 | 9/2006 | Rasti |
| 7,111,172 B1 | 9/2006 | Duane et al. |
| 7,114,652 B2 | 10/2006 | Moullette et al. |
| 7,136,514 B1 | 11/2006 | Wong |
| 7,140,550 B2 | 11/2006 | Ramachandran |
| 7,163,153 B2 | 1/2007 | Blossom |
| 7,195,154 B2 | 3/2007 | Routhenstein |
| 7,197,639 B1 | 3/2007 | Juels et al. |
| 7,219,368 B2 | 5/2007 | Juels et al. |
| 7,225,537 B2 | 6/2007 | Reed |
| 7,225,994 B2 | 6/2007 | Finkelstein |
| 7,246,752 B2 | 7/2007 | Brown |
| 7,298,243 B2 | 11/2007 | Juels et al. |
| 7,334,732 B2 | 2/2008 | Cooper |
| 7,337,326 B2 | 2/2008 | Palmer et al. |
| 7,346,775 B2 | 3/2008 | Gasparini et al. |
| 7,356,696 B1 | 4/2008 | Jakobsson et al. |
| 7,357,319 B1 | 4/2008 | Lin et al. |
| 7,359,507 B2 | 4/2008 | Kaliski |
| 7,360,688 B1 | 4/2008 | Harris |
| 7,363,494 B2 | 4/2008 | Brainard et al. |
| 7,380,710 B2 | 6/2008 | Brown |
| 7,398,253 B1 | 7/2008 | Pinnell |
| 7,404,087 B2 | 7/2008 | Teunen |
| 7,424,570 B2 | 9/2008 | D'Albore et al. |
| 7,427,033 B1 | 9/2008 | Roskind |
| 7,454,349 B2 | 11/2008 | Teunen et al. |
| 7,461,250 B1 | 12/2008 | Duane et al. |
| 7,461,399 B2 | 12/2008 | Juels et al. |
| 7,472,093 B2 | 12/2008 | Juels |
| 7,472,829 B2 | 1/2009 | Brown |
| 7,494,055 B2 | 2/2009 | Fernandes et al. |
| 7,502,467 B2 | 3/2009 | Brainard et al. |
| 7,502,933 B2 | 3/2009 | Jakobsson et al. |
| 7,503,485 B1 | 3/2009 | Routhenstein |
| 7,516,492 B1 | 4/2009 | Nisbet et al. |
| 7,523,301 B2 | 4/2009 | Nisbet et al. |
| 7,530,495 B2 | 5/2009 | Cooper |
| 7,532,104 B2 | 5/2009 | Juels |
| 7,543,739 B2 | 6/2009 | Brown et al. |
| 7,559,464 B2 | 7/2009 | Routhenstein |
| 7,562,221 B2 | 7/2009 | Nystrom et al. |
| 7,562,222 B2 | 7/2009 | Gasparini et al. |
| 7,580,898 B2 | 8/2009 | Brown et al. |
| 7,584,153 B2 | 9/2009 | Brown et al. |
| 7,591,426 B2 | 9/2009 | Osterweil et al. |
| 7,591,427 B2 | 9/2009 | Osterweil |
| 7,602,904 B2 | 10/2009 | Juels et al. |
| 7,631,804 B2 | 12/2009 | Brown |
| 7,639,537 B2 | 12/2009 | Sepe et al. |
| 7,641,124 B2 | 1/2010 | Brown et al. |
| 7,660,902 B2 | 2/2010 | Graham et al. |
| 7,828,207 B2 | 11/2010 | Cooper |
| 7,959,065 B2 | 6/2011 | Rosenblatt et al. |
| 2001/0034702 A1 | 10/2001 | Mockett et al. |
| 2001/0047335 A1 | 11/2001 | Arndt et al. |
| 2002/0059114 A1 | 5/2002 | Cockrill et al. |
| 2002/0082989 A1 | 6/2002 | Fife et al. |
| 2002/0096570 A1 | 7/2002 | Wong et al. |
| 2002/0120583 A1 | 8/2002 | Keresman, III et al. |
| 2003/0034388 A1 | 2/2003 | Routhenstein et al. |
| 2003/0052168 A1 | 3/2003 | Wong |
| 2003/0057278 A1 | 3/2003 | Wong |
| 2003/0116635 A1 | 6/2003 | Taban |
| 2003/0152253 A1 | 8/2003 | Wong |
| 2003/0163287 A1 | 8/2003 | Vock et al. |
| 2003/0173409 A1 | 9/2003 | Vogt et al. |
| 2003/0179909 A1 | 9/2003 | Wong et al. |
| 2003/0179910 A1 | 9/2003 | Wong |
| 2003/0226899 A1 | 12/2003 | Finkelstein |
| 2004/0035942 A1 | 2/2004 | Silverman |
| 2004/0054574 A1 | 3/2004 | Kaufman et al. |
| 2004/0133787 A1 | 7/2004 | Doughty |

(56) References Cited

U.S. PATENT DOCUMENTS

| | | |
|---|---|---|
| 2004/0162732 A1 | 8/2004 | Rahim et al. |
| 2004/0172535 A1 | 9/2004 | Jakobsson |
| 2004/0177045 A1 | 9/2004 | Brown |
| 2005/0043997 A1 | 2/2005 | Sohata et al. |
| 2005/0080747 A1 | 4/2005 | Anderson et al. |
| 2005/0086160 A1 | 4/2005 | Wong et al. |
| 2005/0086177 A1 | 4/2005 | Anderson et al. |
| 2005/0097459 A1* | 5/2005 | Self ............................... 715/517 |
| 2005/0116026 A1 | 6/2005 | Burger et al. |
| 2005/0119940 A1 | 6/2005 | Concilio et al. |
| 2005/0154643 A1 | 7/2005 | Doan et al. |
| 2005/0211768 A1* | 9/2005 | Stillman ................. G07F 11/00 235/381 |
| 2005/0228959 A1 | 10/2005 | D'Albore et al. |
| 2006/0000900 A1 | 1/2006 | Fernandes et al. |
| 2006/0037073 A1 | 2/2006 | Juels et al. |
| 2006/0041759 A1 | 2/2006 | Kaliski et al. |
| 2006/0085328 A1 | 4/2006 | Cohen et al. |
| 2006/0091223 A1 | 5/2006 | Zellner |
| 2006/0161435 A1 | 7/2006 | Atef et al. |
| 2006/0163353 A1 | 7/2006 | Moulette et al. |
| 2006/0174104 A1 | 8/2006 | Crichton et al. |
| 2006/0196931 A1 | 9/2006 | Holtmanns et al. |
| 2006/0256961 A1 | 11/2006 | Brainard et al. |
| 2007/0034700 A1 | 2/2007 | Poidomani et al. |
| 2007/0114274 A1 | 5/2007 | Gibbs et al. |
| 2007/0124321 A1 | 5/2007 | Szydlo |
| 2007/0152039 A1* | 7/2007 | Bychkov ............ G06Q 20/1235 235/381 |
| 2007/0152070 A1 | 7/2007 | D'Albore |
| 2007/0152072 A1 | 7/2007 | Frallicciardi et al. |
| 2007/0153487 A1 | 7/2007 | Frallicciardi et al. |
| 2007/0174614 A1 | 7/2007 | Duane et al. |
| 2007/0241183 A1 | 10/2007 | Brown et al. |
| 2007/0241201 A1 | 10/2007 | Brown et al. |
| 2007/0256123 A1 | 11/2007 | Duane et al. |
| 2007/0192249 A1 | 12/2007 | Biffle et al. |
| 2007/0291753 A1 | 12/2007 | Romano |
| 2008/0005510 A1 | 1/2008 | Sepe et al. |
| 2008/0008315 A1 | 1/2008 | Fontana et al. |
| 2008/0008322 A1 | 1/2008 | Fontana et al. |
| 2008/0010675 A1 | 1/2008 | Massascusa et al. |
| 2008/0016351 A1 | 1/2008 | Fontana et al. |
| 2008/0019507 A1 | 1/2008 | Fontana et al. |
| 2008/0028447 A1 | 1/2008 | O'Malley et al. |
| 2008/0040271 A1 | 2/2008 | Hammad et al. |
| 2008/0040276 A1 | 2/2008 | Hammad et al. |
| 2008/0058016 A1 | 3/2008 | Di Maggio et al. |
| 2008/0059379 A1 | 3/2008 | Ramaci et al. |
| 2008/0096326 A1 | 4/2008 | Reed |
| 2008/0126398 A1 | 5/2008 | Cimino |
| 2008/0128515 A1 | 6/2008 | Di Iorio |
| 2008/0148394 A1 | 6/2008 | Poidomani et al. |
| 2008/0201264 A1 | 8/2008 | Brown et al. |
| 2008/0209550 A1 | 8/2008 | Di Iorio |
| 2008/0288699 A1 | 11/2008 | Chichierchia |
| 2008/0294930 A1 | 11/2008 | Varone et al. |
| 2008/0302877 A1 | 12/2008 | Musella et al. |
| 2009/0013122 A1 | 1/2009 | Sepe et al. |
| 2009/0036147 A1 | 2/2009 | Romano |
| 2009/0046522 A1 | 2/2009 | Sepe et al. |
| 2009/0108064 A1 | 4/2009 | Fernandes et al. |
| 2009/0150295 A1 | 6/2009 | Hatch et al. |
| 2009/0152365 A1 | 6/2009 | Li et al. |
| 2009/0159700 A1 | 6/2009 | Mullen |
| 2009/0166375 A1* | 7/2009 | Butler .................. G06Q 20/123 221/282 |
| 2009/0242648 A1 | 10/2009 | Di Sirio et al. |
| 2009/0244858 A1 | 10/2009 | Di Sirio et al. |
| 2009/0253460 A1 | 10/2009 | Varone et al. |
| 2009/0255996 A1 | 10/2009 | Brown et al. |
| 2009/0290704 A1 | 11/2009 | Cimino |
| 2009/0303885 A1 | 12/2009 | Longo |
| 2010/0306072 A1* | 12/2010 | Ford, Jr. ............... G06Q 20/202 705/38 |
| 2011/0028184 A1 | 2/2011 | Cooper |
| 2013/0056540 A1* | 3/2013 | Blot .................. G06K 19/0719 235/492 |
| 2013/0227481 A1* | 8/2013 | Keys et al. .................... 715/810 |

OTHER PUBLICATIONS

U.S. Appl. No. 60/675,388, Poidomani et al.

Washington Metro Area Transit Authority Smarttrip Technical Specification, May 30, 1997, as released at http://www.epic.org/foia_notes/wmata.pdf.

"Metro History" article at http://www.wmata.com/about_metro/docs/history.pdf as of Feb. 26, 2013.

* cited by examiner

MAKE YOUR OWN GIFT CARD

ENTER DOLLAR AMOUNTS FOR
THOSE MERCHANTS SELECTED
1802

| | | |
|---|---|---|
| BEST BUY | $ | 50.00 — 1804 |
| RADIO SHACK | $ | 25.00 — 1806 |
| WALMART | $ | 30.00 — 1808 |

↑ NEXT

↓ PREVIOUS

TRADE IN YOUR CURRENT CARD

DETERMINE CARD TRANSFER

2802 TRANSFER CREDIT ACCOUNTS?  Y  N
IF NO, CREDIT ACCOUNT WILL AUTOMATICALLY BE CLOSED

2804 CREATE NEW GIFT CARDS?  Y  N
IF NO, GIFT CARD CREDIT WILL AUTOMATICALLY TRANSFER TO CUSTOMER'S ON-LINE ACCOUNT

2806 SELL LOYALTY POINTS?  Y  N
CASH FOR LOYALTY POINTS?  Y  N
IF NO, LOYALTY POINT CREDIT WILL TRANSFER TO ON-LINE LOYALTY ACCOUNT

PREVIOUS    NEXT

TRADE IN YOUR CURRENT CARD

VERIFY CARD TRANSFER

YOU HAVE REQUESTED THE FOLLOWING ACTIONS:

- AMERICAN EXPRESS ACCOUNT WILL NOT BE TRANSFERRED

- AMERICAN EXPRESS ACCOUNT WILL BE CLOSED AUTOMATICALLY UPON COMPLETION OF THIS TRANSACTION

- YOU WILL BE ALLOWED TO GENERATE ONE OR MORE GIFT CARDS AT THE COMPLETION OF THIS TRANSACTION

- LOYALTY POINTS WILL BE SOLD AND DISPENSED AS CASH

IF YOU AGREE, RELINQUISH YOUR CARD TO THE CARD FEEDER OF THIS MACHINE AND CLICK "NEXT" TO COMPLETE REQUESTED TRANSFER AND TO COMPLETE THE REQUESTED GIFT CARD TRANSACTIONS

← PREVIOUS

NEXT →

FIG. 29

POWERED CARDS AND DEVICES DESIGNED, PROGRAMMED, AND DEPLOYED FROM A KIOSK

CROSS-REFERENCE TO RELATED APPLICATION

This application is a continuation of U.S. patent application Ser. No. 13/277,309 filed Oct. 20, 2011, which claims the benefit of U.S. Provisional Patent Application No. 61/394,959, titled "POWERED CARDS AND DEVICES DESIGNED, PROGRAMMED, AND DEPLOYED FROM A KIOSK," filed Oct. 20, 2010, which is hereby incorporated by reference herein in its entirety.

BACKGROUND OF THE INVENTION

This invention relates to magnetic cards and devices and associated payment systems.

SUMMARY OF THE INVENTION

A card may include a dynamic magnetic communications device. Such a dynamic magnetic communications device may take the form of a magnetic encoder or a magnetic emulator. A magnetic encoder may change the information located on a magnetic medium such that a magnetic stripe reader may read changed magnetic information from the magnetic medium. A magnetic emulator may generate electromagnetic fields that directly communicate data to a magnetic stripe reader. Such a magnetic emulator may communicate data serially to a read-head of the magnetic stripe reader.

All, or substantially all, of the front as well as the back of a card may be a display (e.g., bi-stable, non bi-stable, LCD, or electrochromic display). Electrodes of a display may be coupled to one or more capacitive touch sensors such that a display may be provided as a touch-screen display. Any type of touch-screen display may be utilized. Such touch-screen displays may be operable of determining multiple points of touch. A barcode, for example, may be displayed across all, or substantially all, of a surface of a card. In doing so, computer vision equipment such as barcode readers may be less susceptible to errors in reading a displayed barcode.

A card may be made available to users from a publicly available vending machine (e.g., kiosk). Such a kiosk may be made available to users in high foot-traffic areas, such as in shopping malls, airports, hotel lobbies, etc. The kiosk may provide, for example, a user interface such that users wishing to obtain a new card from the kiosk may do so interactively with the kiosk. Users already in possession of a card may, for example, upgrade or replace their current card through interaction with the kiosk.

One or more varieties of a card, for example, may be stocked within a kiosk. Each card variety may correspond to a card having a subset of predetermined devices that may be associated with a particular card variety. A first card variety, for example, may provide predetermined hardware devices, such as a display, a number of manual input devices (e.g., five buttons), and a magnetic emulator. Other varieties of cards (e.g., cards with two buttons, two LEDs, no display, an RFID, and a magnetic emulator) may be made available from within the kiosk. Each card variety may provide internal electronics (e.g., a processor and memory) to allow, for example, programmable options to be associated (e.g., installed) with each card prior to distribution to the user from the kiosk. In doing so, each card provided from within the kiosk may be customized in accordance with each user's preferences before being distributed to the user from the kiosk.

For example, a card contained within a kiosk may have an option (e.g., a financial product) associated with the card at the time the user requested (e.g., applied for) the card (e.g., a credit card). Accordingly, the user may apply for, be approved for, associate, activate, and take delivery of a customized and fully operational card provided from within a kiosk. Such a customized card may provide, for example, customized products as defined by a user interacting with, for example, a kiosk's user interface (e.g., a display, keyboard, and mouse). Similarly, the user may apply for, install, associate and take delivery of a customized card having more than one option (e.g., multiple financial products) associated with a customized card.

Such financial products may include, for example, payment card accounts (e.g., credit card accounts, debit card accounts, and gift card accounts) and other payment account products (e.g., installment payment accounts) by including associated payment data (e.g., payment card account numbers, payment card account types, expiration dates, and associated additional data, such as requested credit limits and requested interest rates). Additional payment products may include products of the same financial type (e.g., credit), but from different payment network brand associations (e.g., Discover, American Express, Visa, and MasterCard). Similarly, additional payment products may include products of the different financial types (e.g., credit, debit, pre-paid, and installment) but from different payment network brand associations (e.g., Discover, American Express, Visa, and MasterCard). Multiple products may be installed on a card of the same or different financial type from the same payment network brand association.

Incentives may be associated with new products upon activation. For example, rewards points may be associated with each new product that a user may associate with his or her customized card. A user may, for example, request a new product to be associated with the user's customized card and based upon a number of variable parameters (e.g., financial type, payment network brand association, and credit limit) a number of incentives (e.g., rewards points) may be associated with the customized card.

Users with existing cards may update their current cards with new, different, and/or upgraded products while visiting the kiosk. For example, a user may add a gift product, a credit product, a debit product, a pre-paid product, an installment payment account, rewards account, or any other product to an existing card. Adding a product to an existing card may include, for example, adding a payment account number associated with the product as well as any additional data (e.g., expiration date, security codes, and discretionary data). Users may delete products that are associated with their current card. Users may modify products that are associated with their current card.

Users may interact with a kiosk, for example, when updating their current cards. A user may, for example, utilize a kiosk to query their current card as to the nature, quantity, and features of options (e.g., products) that may already be associated with their current card. A user may, for example, insert their current card into a card slot of the kiosk. Internal circuitry within the kiosk (e.g., a magnetic card reader, an RFID, infrared, or a chip reader) may then interrogate the user's current card for preexisting products and associated product details.

A user may, for example, swipe their current card through a magnetic card reader device. Information related to products that may be associated with the user's current card may, for example, be transferred from the current card to the kiosk via, for example, a magnetic emulator device on the current card that is capable of communicating information to the magnetic card reader of the kiosk. An RFID reader of the kiosk, for example, may be used to query an RFID device of a current card, in order to glean product information that may be associated with a current card. A chip reader of the kiosk, for example, may be used to query a chip device (e.g., an EMV chip) in order to get product information that may be associated with a current card.

A current card, for example, may be equipped with circuitry that may be able to transfer information to a kiosk. A programming area of a kiosk (e.g., a display device of the kiosk) may, for example, be operable to receive information from a user's current card when a user presses his/her current card against a display device of the kiosk. The programming area of the kiosk display may, for example, be equipped with sensing circuitry (e.g., capacitive sensing circuitry) that may be operable to detect touch. A user's current card may be equipped, for example, with circuitry that may be operable to simulate touch. Accordingly, a user's current card may be operable to simulate, for example, a series of touches that may be detected by the sensing circuitry of a display of the kiosk as information. In doing so, a user's current card may transfer information to the kiosk that relates to, for example, products that may be associated with the user's current card.

A new product may replace an old and/or expired product on a card. For example, a user may desire to replace an old product (e.g., a Visa branded credit card account) with a new product (e.g., an American Express branded credit card account). The user may interact with the kiosk to apply for, be approved for, associate, and activate the new product via a kiosk. Alternately, a user may desire to surrender their old card at a kiosk in exchange for a new card that may be provided by the kiosk having the same, different and/or upgraded products as compared to the old card.

A user's current card may be programmed with the new, different, and/or upgraded products while visiting a kiosk. For example, a programming area of a display of a kiosk may be operable to relay information to a user's card (e.g., by flashing a light within the programming area of a display of a kiosk). A user's current card may, for example, include a light sensor, such that when pressed against the programming area of a kiosk display, may receive information (e.g., flashing light information) as provided by the kiosk. In doing so, the card may construe the flashing light information received from the kiosk as programming information (e.g., new, different, and/or upgraded product information) that may be associated with the user's current card. Programming information may be received via other programming modes (e.g., exposed IC chip and RFID).

A new card may be personalized at a kiosk. A user may design, for example, a virtual card by selecting design features of a card through interactive operations with a graphical user interface (GUI) of a kiosk (e.g., mouse operations, voice commands, and keyboard operations). A GUI of a kiosk may update design features of a card (e.g., a virtual card displayed on the GUI) in real time as the user adds design features. In so doing, a user may interactively pick and choose design features (e.g., background coloration, signature panel dimensions, button labels, images, and hologram design) of a virtual card before settling in on a final design.

Printing circuitry may be deployed within a kiosk. For example, a kiosk may be deployed with printing and/or pressing capability such that an actual card may be printed and distributed to a user from the kiosk. The actual card printed and distributed to the user may be substantially identical to the virtual card that may have been designed by the user at a kiosk.

Any option (e.g., product), any design feature, and any other attribute that may be associated with a card may be selected and/or approved, for example, by visiting a website that may be accessible from a network (e.g., internet) connection. For example, a user may visit a website from a remote location (e.g., the comfort of his or her home) that provides all or a portion of the functionality that may be offered by a GUI of a kiosk. In doing so, a user may generate a description of a virtual card that may fully define each option, design feature, and/or any other attribute that may be associated with a card. The description may be communicated to a different location (e.g., any kiosk, printing/programming station, or manufacturing plant) where the user's customized card may be realized, printed, and distributed.

A kiosk may be connected to a network (e.g., the internet). Accordingly, any option (e.g., product) that may be requested by a user to be associated with a card may be approved or disapproved to the user via operation of the network. The GUI of the kiosk may provide approval and/or disapproval information concerning the products that may be requested by the user. Should a user be interacting with a kiosk having limited operational capabilities (e.g., a kiosk having an insufficient supply of cards), a kiosk may nevertheless complete the design experience for a user. Once completed, the design may then be transferred from that kiosk to another location (e.g., another conveniently located kiosk that is fully functional) so that the user may collect his or her newly created card from the fully functional kiosk.

BRIEF DESCRIPTION OF THE DRAWINGS

The principles and advantages of the present invention can be more clearly understood from the following detailed description considered in conjunction with the following drawings, in which the same reference numerals denote the same structural elements throughout, and in which:

FIG. 7 is an illustration of display screens constructed in accordance with the principles of the present invention;

FIG. 18 is an illustration of display screens constructed in accordance with the principles of the present invention;

FIG. 28 is an illustration of display screens constructed in accordance with the principles of the present invention;

FIG. 29 is an illustration of display screens constructed in accordance with the principles of the present invention.

DETAILED DESCRIPTION OF THE INVENTION

Figure 1:
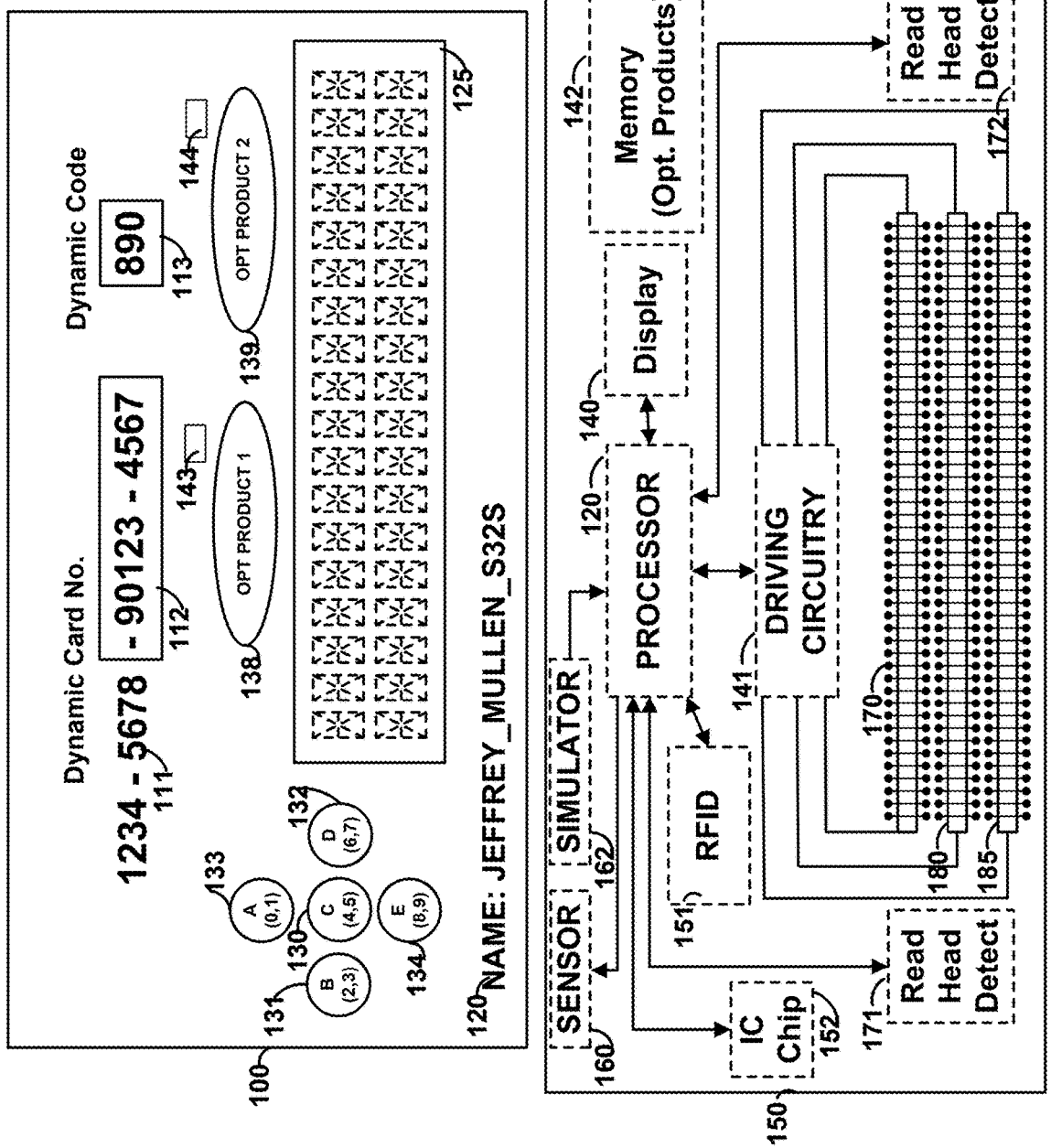
FIG. 1 is an illustration of cards constructed in accordance with the principles of the present invention.

FIG. 1 shows card 100 that may include, for example, a dynamic number that may be entirely, or partially, displayed via display 112. A dynamic number may include a permanent portion such as, for example, permanent portion 111. Permanent portion 111 may be printed, pressed, as well as embossed or laser etched on card 100. Multiple displays may be provided on a card. For example, display 113 may be utilized to display a dynamic code such as a dynamic security code. Display 125 may also be provided to display logos, barcodes, as well as multiple lines of information. A display may be a bi-stable display or non bi-stable display. Permanent information 120 may also be included and may include information such as information specific to a user (e.g., a user's name or username) or information specific to a card (e.g., a card issue date and/or a card expiration date). Card 100 may include one or more buttons such as buttons 130-134. Such buttons may be mechanical buttons, capacitive buttons, or a combination of mechanical and capacitive buttons.

Buttons 138 and 139 may be included and may be associated with optional products. For example, card 100 may exist within a vending machine (e.g., a kiosk) as a blank card (e.g., a card having a predetermined hardware configuration, but no products or options associated with the card). Card 100, however, may have one or more products selected, authorized, and associated with the card in case the user of card 100 determines those products to be useful in light of the user's preferences.

A product, or a product activation code representative of a product, may be utilized to associate a product with a card. The product and/or activation code, once selected by a user, may be stored on the card. The product and/or activation code may be entered into a card contained within a kiosk through commands entered by a user via the kiosk. Commands (e.g., information indicative of products to be associated with a card) may be entered online via a website, communicated to the kiosk, and then entered into a card contained within a kiosk.

Products that may be associated with a card (e.g., by using a kiosk or associated website) may include, for example, debit products (e.g., decoupled or coupled debit products), credit products, gift products, pre-paid payment products, loyalty products, or any other type of product. Such products may each have a different number that may be communicated via one or more reader communications device (e.g., an RFID antenna, IC chip, magnetic stripe communications device, or touch simulating display).

Products may be associated with one or more buttons of a card contained within a kiosk. For example, blank cards may include one or more buttons having no particular functionality. Functionalities, however, may be associated with one or more buttons of a blank card using, for example, a kiosk. A kiosk, for example, may provide the ability for a user to associate one or more products with one or more buttons using, for example, a GUI of the kiosk during customization of the blank card. Once the customized card is delivered to the user from the kiosk, the user may press the one or more buttons to invoke the one or more functions associated with the one or more buttons.

Accordingly, a user may press a button associated with an option (e.g., a credit card product), for example, to have a credit card number associated with that credit card product communicated via a communications device (e.g., a magnetic stripe communications device). A user may press a different button, for example, associated with another option (e.g., a loyalty product) to have the loyalty number associated with that loyalty product communicated via a communications device (e.g., the same magnetic stripe communications device that communicated the credit card number).

Alternatively, for example, a user may already be in possession of a card and may wish to change some or all of the functionalities previously associated with the card. A user may introduce the card to the kiosk (e.g., place the card into a card slot of the kiosk), so that the kiosk may extract information from the card that is indicative of options previously associated with the card. In doing so, the kiosk may report (e.g., via a display of the kiosk) to the user any and/or all of the options associated with the card. Once known, the user may delete, change, upgrade, or monitor options previously associated with the card via a display of the kiosk. Should the user desire to delete, change and/or upgrade his/her current card, user interfaces of the kiosk may provide programming functionalities (e.g., light, sound, wireless, or wire-based communication signals) to delete, change and/or upgrade any options that may be associated with the user's current card.

A user, for example, may log into his/her online account to customize a new card. A user, for example, may log into his/her online account to delete, change and/or upgrade any options that may be associated with a user's current card. For example, a website may offer the same or similar user interface as may be offered by a kiosk. Accordingly, a user may utilize a remote location (e.g., an internet café) to access a website either to design a new card or to delete, change and/or upgrade any options that may be associated with a user's current card. Any virtual creations and/or changes made by the user via the website, may be saved for subsequent implementation at a manufacturing facility (e.g., a kiosk of the user's choosing).

Incentives to associate a new option (e.g., product) with a new or current card may be provided to a user. Such incentives may be displayed online (e.g., via a webpage) or by a GUI of a kiosk. For example, a user may associate an option with a virtual button of a virtual card on a GUI of a kiosk and may be provided with an incentive for the association. For example, a user may be provided with text indicating that if the user associates a particular product, then an amount of money may be added to a user's account. Once a physical card is produced from the kiosk, the card may provide control devices (e.g., buttons) to allow the user to utilize the incentives.

Architecture 150 may be utilized with any card. Architecture 150 may include processor 120. Processor 120 may have on-board memory for storing information (e.g., associated product information). Any number of components may communicate to processor 120 and/or receive communications from processor 120. For example, one or more displays (e.g., display 140) may be coupled to processor 120. Persons skilled in the art will appreciate that components may be placed between particular components and processor 120. For example, a display driver circuit may be coupled between display 140 and processor 120. Memory 142 may be coupled to processor 120. Memory 142 may include data that is unique to a particular card. For example, memory 142 may include user-specific and card-specific data (e.g., name, account numbers, product information, and incentives for associated products).

Any number of reader communication devices may be included in architecture 150. For example, IC chip 152 may be included to communicate information to an IC chip reader. IC chip 152 may be, for example, an EMV chip. As per another example, RFID 151 may be included to communicate information to an RFID reader. A magnetic stripe communications device may also be included to communicate information to a magnetic stripe reader. Such a magnetic stripe communications device may provide electromagnetic signals to a magnetic stripe reader.

Different electromagnetic signals may be communicated to a magnetic stripe reader to provide different tracks of data. For example, electromagnetic field generators 170, 180, and 185 may be included to communicate separate tracks of information to a magnetic stripe reader. Such electromagnetic field generators may include a coil wrapped around one or more materials (e.g., a soft-magnetic material and a non-magnetic material). Each electromagnetic field generator may communicate information serially to a receiver of a magnetic stripe reader for a particular magnetic stripe track.

Read-head detectors 171 and 172 may be utilized to sense the presence of a magnetic stripe reader (e.g., a read-head housing of a magnetic stripe reader). The sensed information may be communicated to processor 120 to cause processor 120 to communicate information serially from electromagnetic generators 170, 180, and 185 to magnetic stripe track receivers in a read-head housing of a magnetic stripe reader. Accordingly, a magnetic stripe communications device may change the information communicated to a magnetic stripe reader at any time. Processor 120 may, for example, communicate user-specific and card-specific information through RFID 151, IC chip 152, and electromagnetic generators 170, 180, and 185 to card readers coupled to remote information processing servers (e.g., purchase authorization servers). Driving circuitry 141 may be utilized by processor 120, for example, to control electromagnetic generators 170, 180, and 185.

Architecture 150 may include one or more sensors 160 (e.g., light sensors). Sensors 160 may receive information via, for example, light pulses communicated by a light source and sensed by sensors 160. Architecture may include one or more simulators 162 (e.g., touch simulators). Simulators 162 may simulate, for example, one or more human touches when pressed against a touch sensitive device (e.g., a touch sensitive display). Accordingly, architecture 150 may be used to transmit information to a touch sensitive display by simulating a series of touches that may be sensed by the touch sensitive display.

Figure 2:
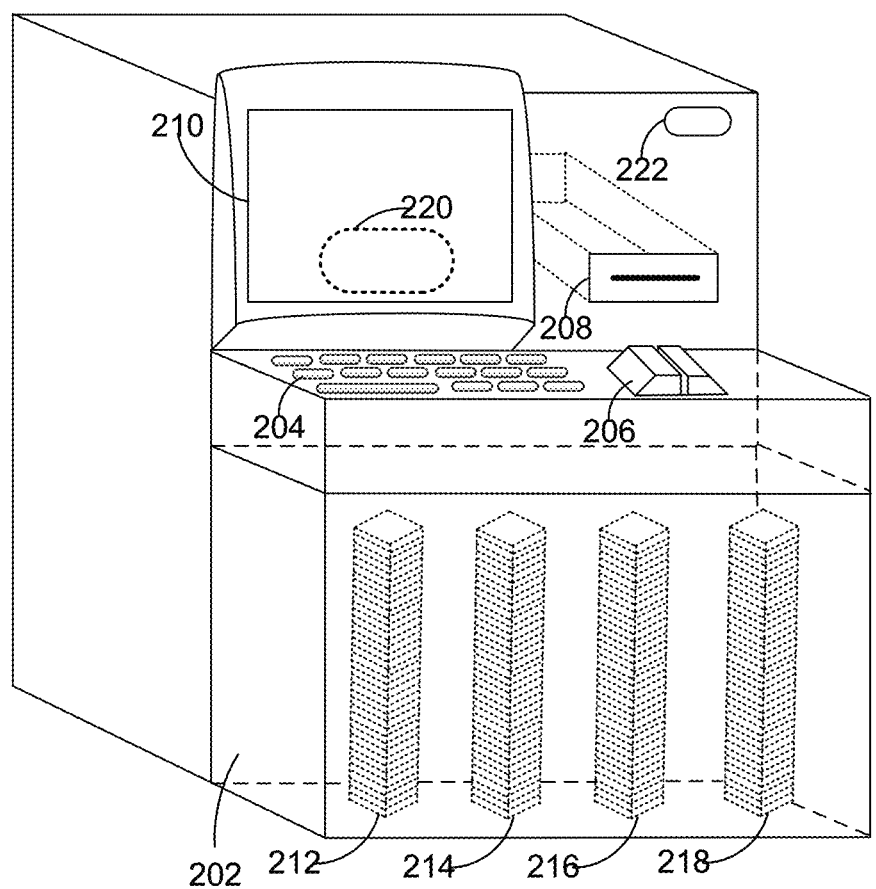
FIG. 2 is an illustration of a kiosk constructed in accordance with the principles of the present invention.

FIG. 2 shows kiosk 200. Kiosk 200 may include a user interface that may include, for example, display 210, keyboard 204, magnetic stripe reader 206, card slot 208, RFID interface 222, and programming/interrogation area 220. Compartment 202 may be included within kiosk 200. Accordingly, various card varieties 212-218 may be stocked within compartment 202 of kiosk 200. Card varieties 212-218 may include one or more variations (e.g., different hardware configurations) whose operation may be customized in accordance with a user's desires during a customization event. For example, card variety 212 may include a particular hardware configuration (e.g., two-buttons without a display). Card variety 214 may include, for example, an alternate hardware configuration (e.g., five-buttons with three displays). Persons skilled in the art will appreciate that many card varieties may be stocked within kiosk 200, where each card variety may include associated hardware configurations (e.g., processors, memory, input and/or output devices). Accordingly, each blank card and associated hardware configuration may be programmed and/or reprogrammed during one or more customization events to provide a card with customized operations that may be based upon design inputs received at kiosk 200 by a user of kiosk 200.

A customization event may include one or more design/ alteration sessions held by a user at kiosk 200. For example, one or more GUIs may be presented by display 210 to allow a user to design a new card or to delete, change and/or upgrade any options that may be associated with a user's current card.

A user of kiosk 200 may, for example, utilize kiosk 200 to design a card having customized capabilities that may be associated with, for example, a particular hardware configuration of a particular card variety contained within compartment 202. A user of kiosk 200 may, for example, present his/her current card to an input device (e.g., card reader 206 or interrogation area 220) of kiosk 200. In doing so, kiosk 200 may interrogate the user's current card for any options that may be associated with the user's current card and display results of the interrogation onto display 210. For example, a user's current card may include one or more products that the user may wish to delete, change, and/or upgrade. By interrogating and displaying such products onto display 210, a user may make any alterations that he/she may desire by interacting with the various GUIs presented by display 210.

Kiosk 200 may include card slot 208. Card slot 208 may provide a means by which a user may discard his/her current card in exchange for a new card. Alternately, users may wish to delete, change, and/or upgrade their current cards without discarding them. Accordingly, interrogation devices (e.g., card reader 206, interrogation area 220, and RFID 222) may be utilized to glean a current configuration that may be associated with a user's current card. The current configuration may be displayed onto display 210 of kiosk 200 for subsequent monitoring and/or modification by a user.

Modification of a card's current configuration, for example, may be implemented by a programming region (e.g., programming area 220 of display 210). For example, a user's current card may be equipped with sensors (e.g., light sensors) that may be sensitive to light pulses generated within programming area 220 of display 210. The light sensors of the user's current card may receive a series of such light pulses, which may be construed as a configuration definition. For example, a user's current card may receive an optical data stream represented by a series of light pulses received from programming region 220. The optical data stream may define, for example, the operational mode of each component (e.g., button(s), display(s), data receivers, and data transmitters) that may exist within the user's current card.

A card may contain an RFID device having bidirectional data capability. Accordingly, RFID 222 may be used to interrogate a user's current card configuration for subsequent monitoring and/or modification via a series of one or more GUIs that may be displayed by display 210.

Display 210 may include interrogation area 220 that may be sensitive to touch (e.g., through use of a capacitive touch sensor). A card may include a corresponding electronic device that may simulate such a touch. In doing so, a user's current card may communicate with interrogation area 220 by simulating a series of touches that may be understood by kiosk 200 as a series of configuration data bits that may correspond to a configuration of a user's current card. Such configuration information may be subsequently monitored and/or modified via a series of one or more GUIs that may be displayed by display 210.

Card reader 206 may be used to interrogate a user's current card. For example, the user's current card may be inserted (e.g., swiped) into card reader 206. Configuration data may be transferred to kiosk 200 through operation of electromagnetic field generators present within the user's current card that are capable of communication with card reader 206. For example, electromagnetic field generators present within the user's current card may communicate configuration information to magnetic stripe track receivers in a read-head housing of a magnetic stripe reader (e.g., card reader 206). Such configuration information may be subsequently monitored and/or modified via a series of one or more GUIs that may be displayed by display 210. Other interrogation means (e.g., an IC chip reader or infrared transceiver) may also be employed to glean information associated with a user's current card.

Figure 3:
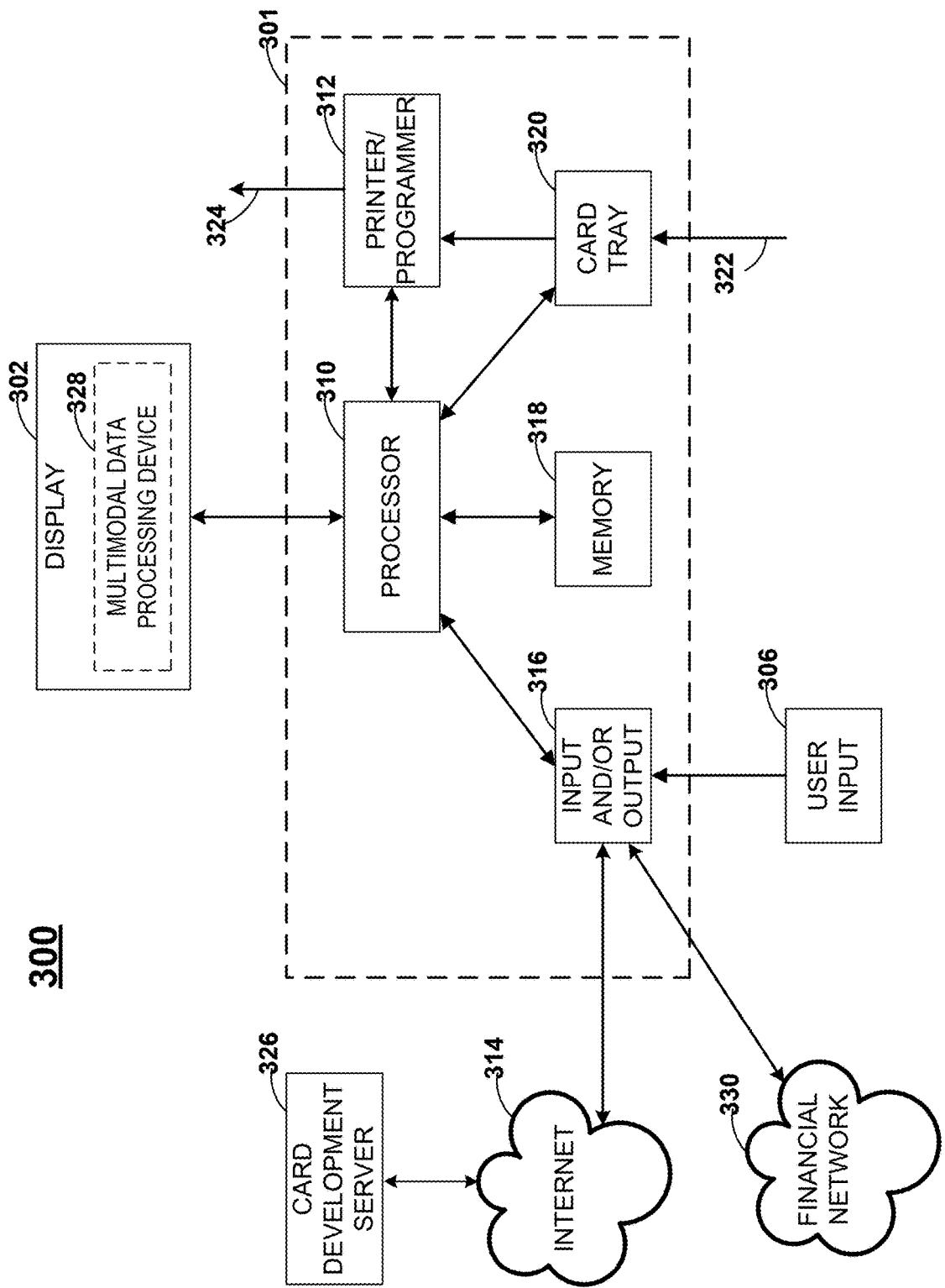
FIG. 3 is an illustration of a network topology constructed in accordance with the principles of the present invention.

FIG. 3 shows network topology 300. Kiosk 301 may include memory 318 and processor 310 for storing and executing code (e.g., GUI application code). The executed GUI application code may generate a series of interactive screens that may be displayed onto display 302 during a customization event (e.g., while a user designs and configures a new card and/or changes, deletes or upgrades options that may be associated with a user's current card).

Kiosk 301 may access a computer readable medium (e.g., CDs, DVDs, and internet 314) via input and/or output device 316. In doing so, executable code (e.g., GUI application code) may be accessed and downloaded into memory 318. Accordingly, processor 310 may execute one or more GUI applications such that a user conducting operations (e.g., card customizations) at kiosk 301 may do so interactively with kiosk 301. For example, a user may be prompted to execute one or more operations through instructions provided via display 302. Such operations may include discarding used cards into card tray 320 and/or presenting a card to kiosk 301 for interrogation of options (e.g., products) that may be associated with a card.

User input 306 may include a series of input operations (e.g., keyboard, mouse, and voice command) operations that may be prompted by a GUI displayed onto display 302. For example, a user may be prompted by a GUI during a customization event to define functional and aesthetic features that are to be associated either with a blank card or a user's current card. Such functional and/or aesthetic features may be rendered onto either a blank card or a user's current card.

In the event that functional and/or aesthetic features are to be associated with a new card, printer/programmer 312 may receive a blank card from card tray 320 and may install such functional and/or aesthetic features as directed by processor 310. In the event that functional and/or aesthetic features are to be associated with a user's current card, a user may first insert his/her current card into card tray 320 for subsequent delivery to printer/programmer 312 for installation of such functional and/or aesthetic features as directed by processor 310.

Configuration details and products that may be associated with a user's current card may be received from multimodal data processing device 328. For example, a user's current card may provide circuitry to simulate touch and area 328 of display 302 may be touch sensitive. Accordingly, by placing a user's current card against area 328 of display 302, a series of touches may be simulated by the user's current card that may be understood by processor 310 as a series of configuration data bits. Such configuration data bits may be indicative of configuration details and products that may be associated with the user's current card.

A user's current card may contain light sensors that may be sensitive to, for example, varying intensities and/or colors of light. Accordingly, programming area 328 may be used in conjunction with processor 310 to produce time-varying light color and/or intensity that may be received by the light sensors of a user's current card and understood by the user's current card as a series of configuration data bits. In doing so, a user's current card may be optically programmed by placing the user's current card against programming area 328 of display 302 while time-varying light color and/or intensity is used to convey configuration information to the user's current card.

Card development server 326 may be operable to execute similar, or the same, application code (e.g., GUI application code) as may be executed by processor 310 of kiosk 301. Accordingly, a user may access card development server 326 via a network (e.g., internet 314) to define aesthetic and/or functional features that he/she wishes to implement on either a blank card or a user's current card. Once completed, the functional and/or aesthetic features generated by the user may be downloaded from card development server 326 into memory 318 for subsequent access by the user. For example, a user may pre-define functional and/or aesthetic aspects of a customized card via the comfort of his/her own home, visit a kiosk of the user's choice, and download such functional and/or aesthetic features from card development server 326 into the kiosk of choice. Once downloaded, the user may either present his/her current card for modification or may choose to collect a newly customized card from the kiosk of choice. Such a modified current card or newly customized card may be based upon such pre-defined configuration details and may be produced for the user while the customer visits his/her kiosk of choice.

Kiosk 301 may connect to financial network 330. Accordingly, for example, kiosk 301 may provide access to all appropriate authorization servers, information databases, banking institutions, and payment networks that may be necessary to implement functions that may be performed by kiosk 301. For example, users may apply and request approval for one or more payment accounts that are to be associated with either a new card or a user's current card. Accordingly, for example, kiosk 301 may seek approval and gain authorization for such accounts prior to their association to a card.

Figure 4:
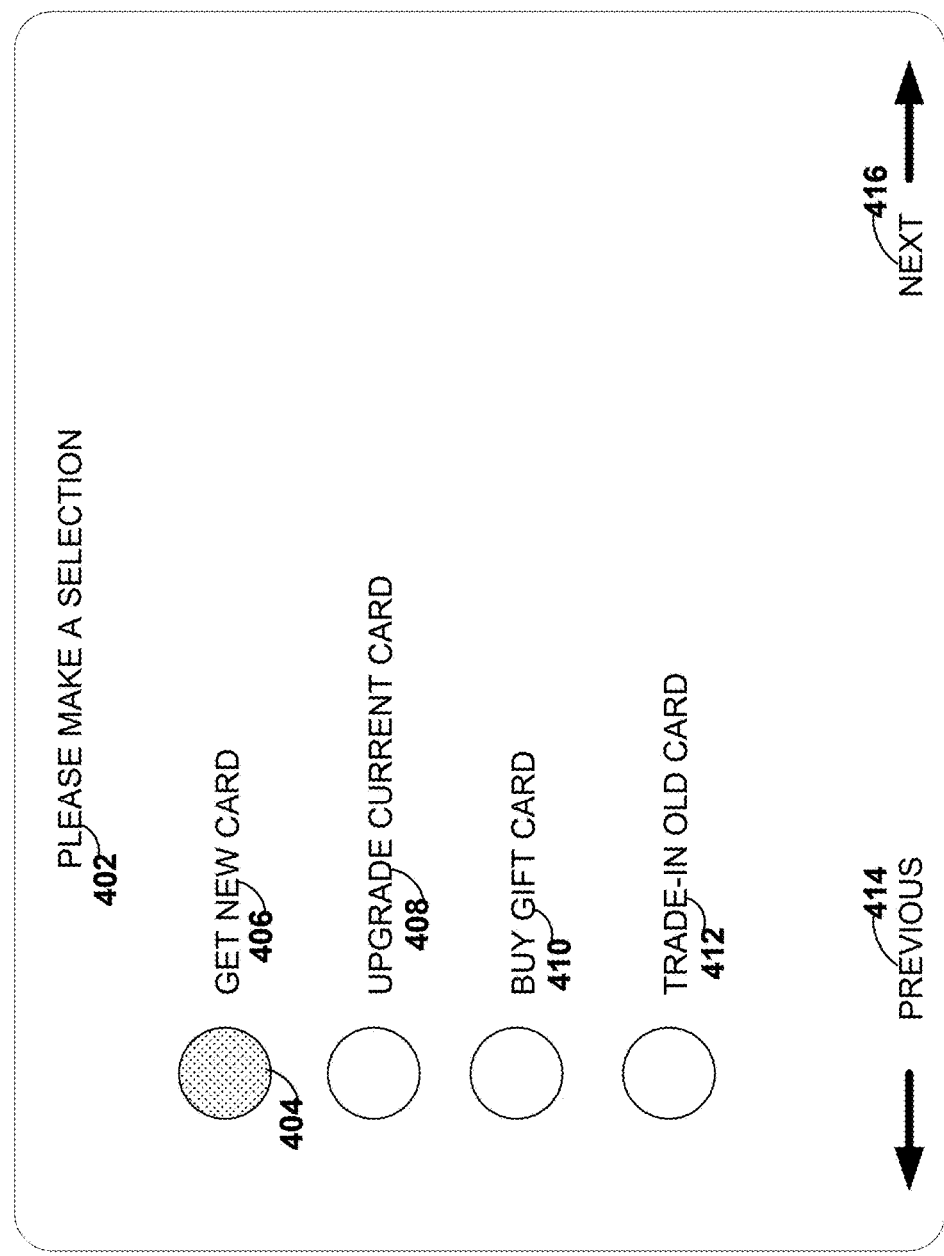
FIG. 4 is an illustration of display screens constructed in accordance with the principles of the present invention.

FIG. 4 shows GUI 400. GUI 400 may be rendered onto a display of a kiosk by a processor implemented within the kiosk. A processor may be executing application code (e.g., GUI application code) that is effective to display GUI 400 that may include command section 402 that displays a command (e.g., "PLEASE MAKE A SELECTION").

Such a command may prompt a user to utilize input devices (e.g., mouse, keypad, and touch/voice activated devices) that may be associated with a kiosk to respond to command 402. For example, GUI 400 may provide one or more responses 406-412 that may be selected by a user of the kiosk in response to command 402. The user may select an appropriate response, for example, by mousing-over and clicking on the desired response. GUI 400 may respond by providing feedback 404 (e.g., highlighted radio button) that is indicative of the user's selected response. Selected response 406 (e.g., "GET NEW CARD") may signify that the user wishes to design a newly customized card at the kiosk. Other responses may include (e.g., "UPGRADE CURRENT CARD" 408, "BUY GIFT CARD" 410, and "TRADE-IN OLD CARD" 412).

GUIs executed by a processor may provide navigational aids (e.g., reverse-navigation 414 and forward-navigation 416). In doing so, a user may traverse all screens necessary to implement a particular customization event that may be required by a user.

Figure 5:
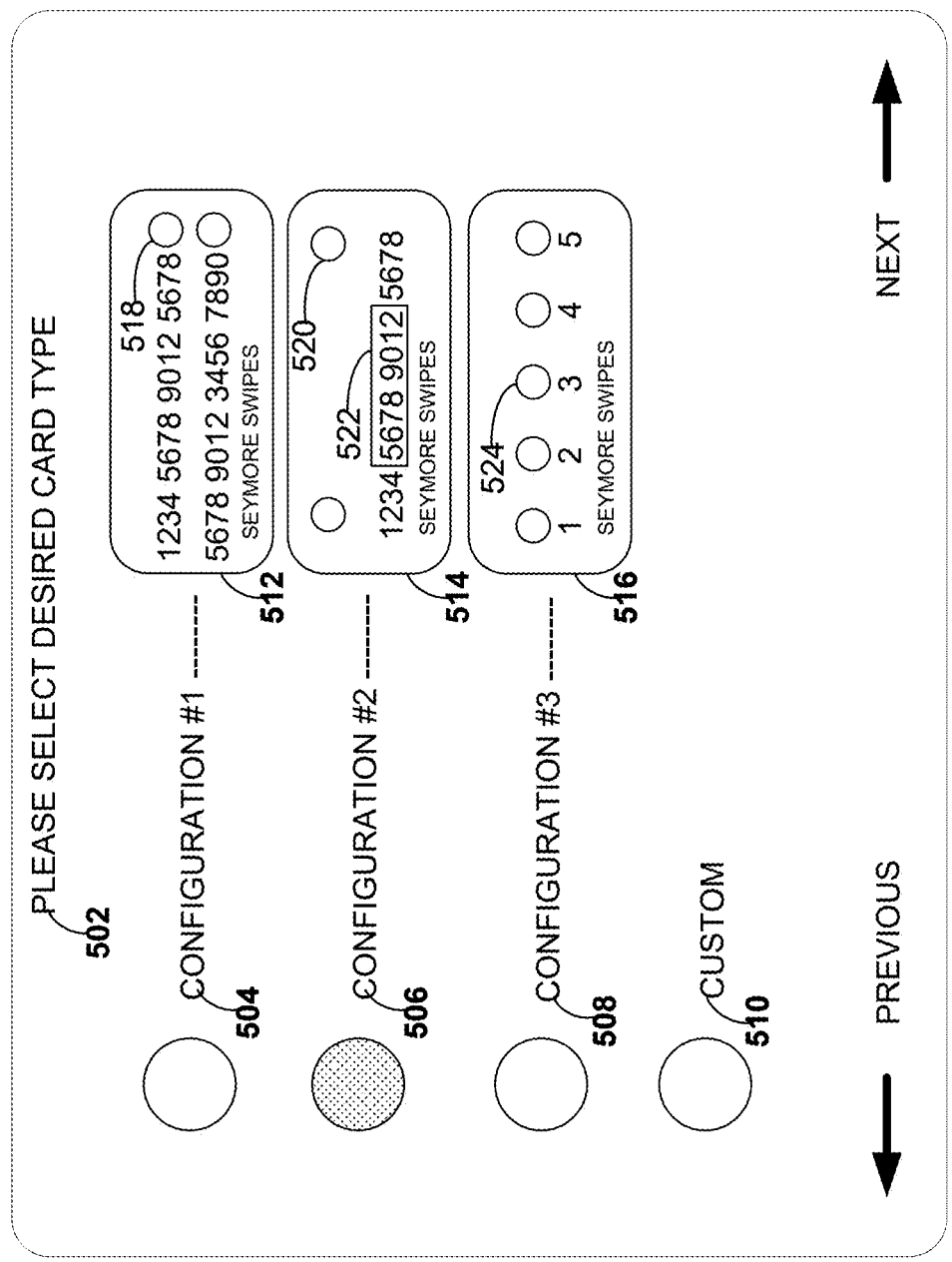
FIG. 5 is an illustration of display screens constructed in accordance with the principles of the present invention.

FIG. 5 shows GUI 500. GUI 500 may be rendered onto a display of a kiosk by a processor implemented within the kiosk. A processor may be executing application code (e.g., GUI application code) that is effective to display GUI 500 that may include command section 502 that displays a command (e.g., "PLEASE SELECT DESIRED CARD TYPE").

GUI 500 may be displayed, for example, when a user wishes to create a newly customized card from a blank card. In some instances, the kiosk is stocked with a variety of blank cards having varied hardware configurations. The blank cards, therefore, may contain a number of hardware elements (e.g., buttons, displays, electromagnetic field generators, RFIDs, ICs, light sources, light sensors, infrared transceivers, and touch simulators), but may not contain any particular configuration definitions that define how the hardware elements operate.

For example, a blank card contained within a kiosk may be illustrated by virtual card 512 having virtual hardware elements (e.g., two buttons 518) and other hardware elements (not shown). A user wishing, for example, to design a card having two separate payment accounts associated with a single card may wish to select card type 504 as his or her virtual blank card selection.

Alternatively, a user may wish to select card type 506 as his or her virtual blank card selection. In this instance, for example, two virtual buttons 520 are illustrated as forming part of virtual card 514 along with virtual display 522 and other hardware elements (not shown) may also be provided. Users wishing to design a card having, for example, dynamic account number portion 522 may select virtual card 514 as their virtual blank card selection. Other virtual card selections may include virtual card 516 having, for example, a plurality of buttons, but with no account numbers displayed at all.

A kiosk may stock many varieties of cards, where each card variety may provide a particular hardware configuration. Should a user wish to design a virtual card that does not correspond to a card variety already contained within a kiosk, a user may select CUSTOM 510. In doing so, a user may design a customized hardware configuration that does not conform to any blank card variety contained within the kiosk. In such an instance, a non-conforming card design may nevertheless be transmitted from the kiosk (or card development website) to a manufacturing facility. In doing so, the user may not be able to retrieve a customized card at the kiosk itself, but may be able to upload a non-conforming design to a manufacturing facility for future delivery.

Figure 6:
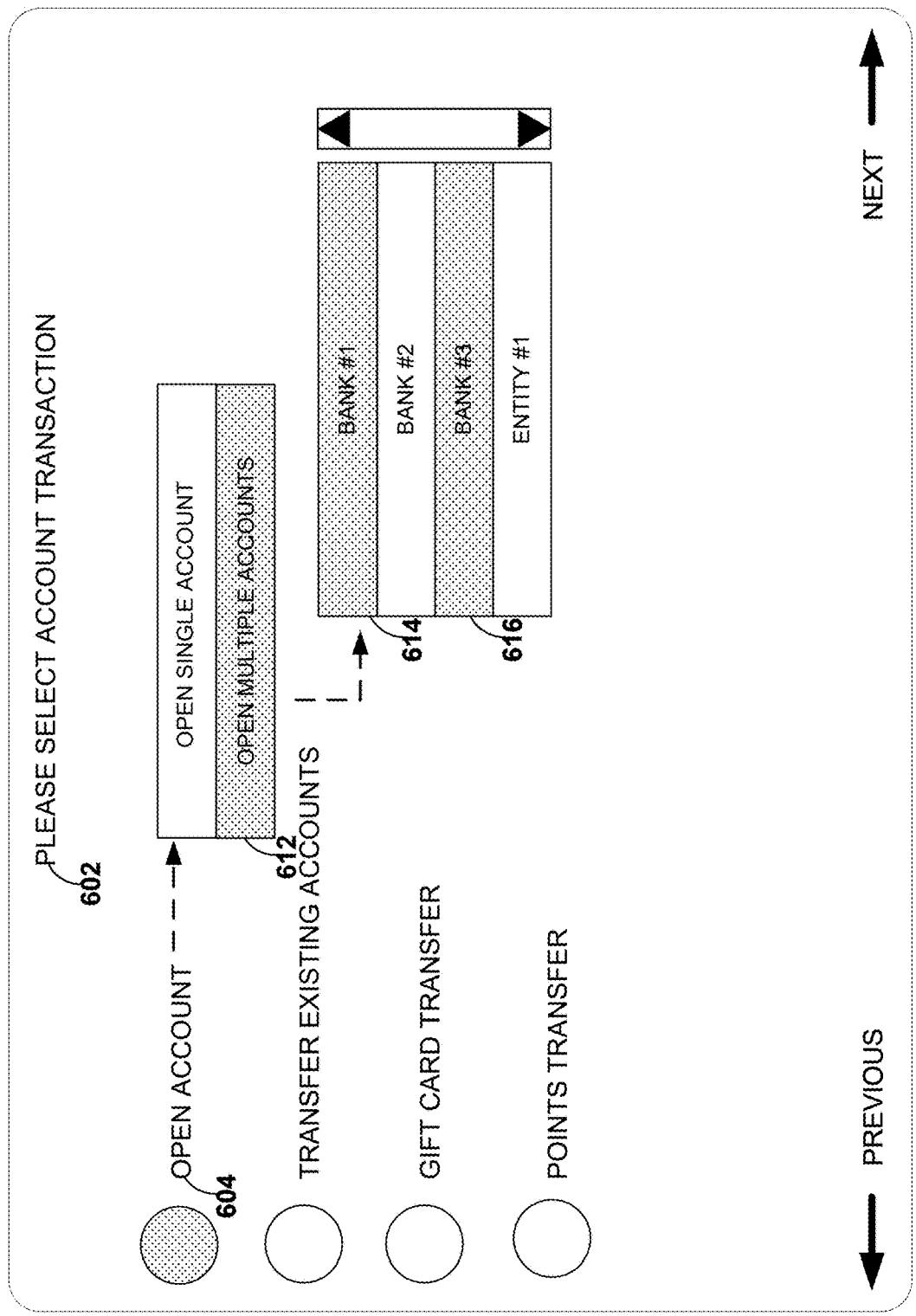
FIG. 6 is an illustration of display screens constructed in accordance with the principles of the present invention.

FIG. 6 shows GUI 600. GUI 600 may be rendered onto a display of a kiosk by a processor implemented within the kiosk. A processor may be executing application code (e.g., GUI application code) that is effective to display GUI 600 that may include command section 602 that displays a command (e.g., "PLEASE SELECT ACCOUNT TRANSACTION").

Once a user has selected a blank card variety, account transaction types, for example, may be associated with the blank card. For example, a user wishing to design a new card having two separate account numbers, may wish to select OPEN ACCOUNT 604 to begin the account selection process. OPEN MULTIPLE ACCOUNTS 612 may then be selected as an account transaction type to perform.

Payment products may include a selection of payment network brand associations. Accordingly, for example, desired network brand associations (e.g., BANK #1 614 and Bank #2 616) may be selected as payment products that may be associated with, for example, two of the many accounts that may ultimately be associated with the user's customized card.

Figure 7:
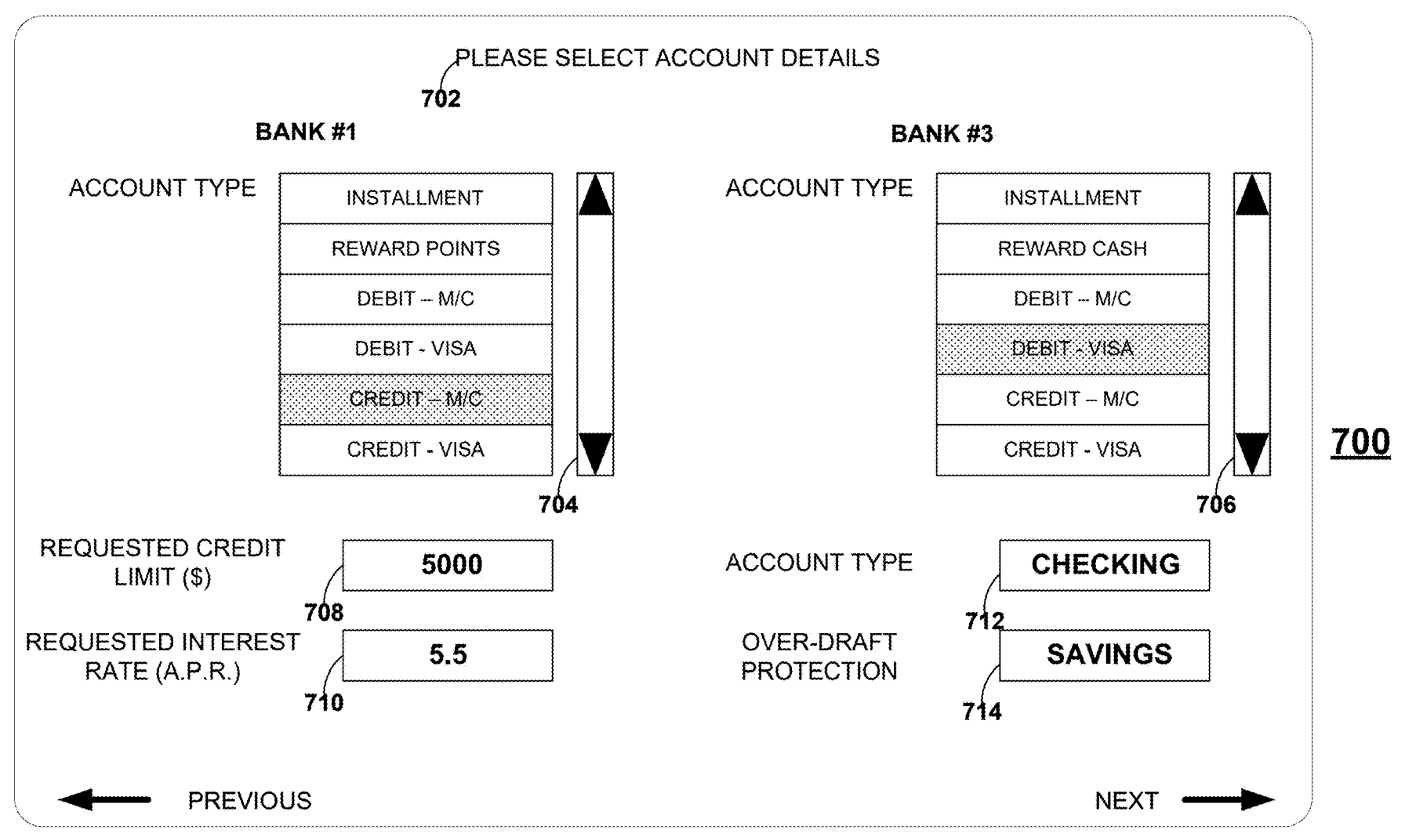

FIG. 7 shows GUI 700. GUI 700 may be rendered onto a display of a kiosk by a processor implemented within the kiosk. A processor may be executing application code (e.g., GUI application code) that is effective to display GUI 700 that may include command section 702 that displays a command (e.g., "PLEASE SELECT ACCOUNT DETAILS").

Payment products may include products of various financial types (e.g., credit, debit, pre-paid, and installment) but those products may be offered by different associations (e.g., Discover, American Express, Visa, and MasterCard). Accordingly, a user may wish to associate at least one financial type with at least one payment network brand on a single card. A user may select, for example, Bank #1 as one payment network brand to be associated with a new card and may then select from one of many account types (e.g., installment, points, debit, and credit) to associate with the payment network brand.

GUI 700, for example, provides for such a selection by allowing the user to scroll through a list of financial types that may be associated with a particular brand by using scroll bar 704 and mouse operations to highlight a desired financial type (e.g., M/C credit). Should a user select more than one payment network brand to be associated with a new card, a user may similarly use scroll bar 706 to associate an additional network brand (e.g., Bank #3) to a particular financial type (e.g., Visa debit).

Depending upon which payment network brands and associated financial types a user has selected, GUI 700 may, for example, provide additional account details. For example, a credit financial type may require a user to supply further information to define terms (e.g., requested credit limit and requested interest rate) of such a credit account. Accordingly, for example, text input boxes 708 and 710 may be provided by GUI 700 to allow the user to define such terms. A debit financial type may require terms (e.g., account type and over-draft protection) to be specified. Accordingly, for example, text input boxes 712 and 714 may be provided by GUI 700 to allow the user to define such terms.

A kiosk may provide access to a financial network. Accordingly, for example, any payment network brands, associated financial account types, and associated terms that may be requested by a user via, for example, GUI 700, may be preauthorized by the kiosk. In doing so, products that a user may wish to associate with a new card may first be approved before being activated for use.

Figure 8:
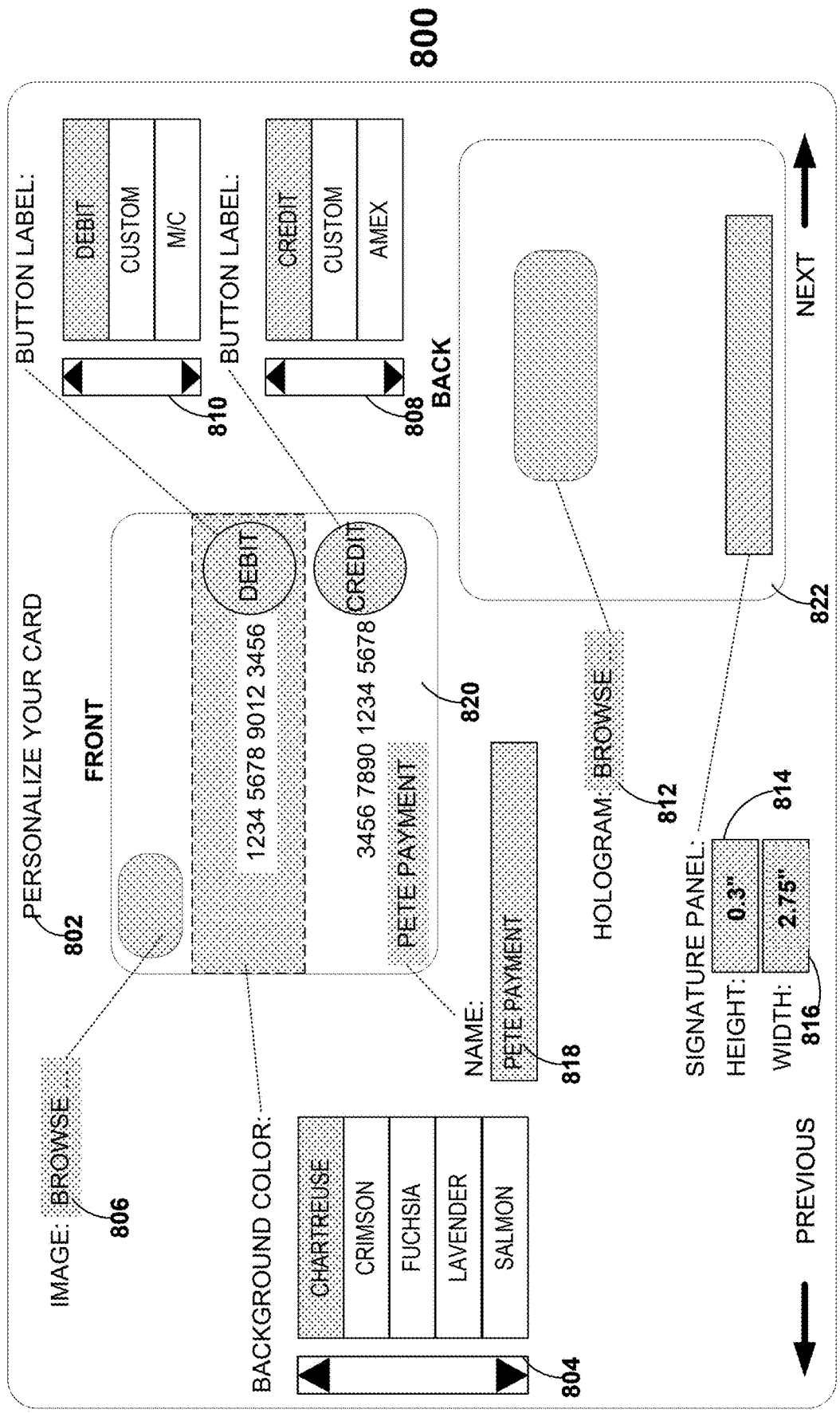
FIG. 8 is an illustration of display screens constructed in accordance with the principles of the present invention.

FIG. 8 shows GUI 800. GUI 800 may be rendered onto a display of a kiosk by a processor implemented within the kiosk. A processor may be executing application code (e.g., GUI application code) that is effective to display GUI 800 that may include command section 802 that displays a command (e.g., "PERSONALIZE YOUR CARD").

A user may select one or more aesthetic features of a card by interacting with GUI 800 to apply such aesthetic features. In addition, a user may gain instant feedback of the aesthetic features selected by viewing a virtual representation of such aesthetic features that may be placed onto a card during a customization event.

Virtual card 820, for example, may be updated by GUI 800 when a user selects which, if any, image link 806 is to be rendered onto the card. User selection may be effected, for example, by image link 806 that may allow a user to link to an image that may be network accessible (or otherwise accessible) by the kiosk. Accordingly, for example, a user may select an image to be rendered onto a new card using link 806, while obtaining instantaneous feedback from virtual card 820 as to what such an image might look like.

A user may select, for example, one or more color bands to be rendered onto a card by appropriate selection from scrolling list 804. Once selected, virtual card 820 may be updated with the color of choice. Persons skilled in the art will appreciate that various patterns may also be selected by a user so as to further enhance a background color that may have been selected by a user. A card may be further personalized with data that is specific to the user (e.g., the user's name). For example, a user may utilize text input 818 as a means to update virtual card 820 with user specific information. Font, style, color and other aesthetic attributes of text input 818 may also be further defined.

Any products that may have been associated with the card may also be identified in a manner that is pleasing and/or helpful to a user. For example, a button label that may be associated with a first payment account may be selected and rendered onto a card. Should such an account be a debit account, for example, a user may select button labels, such as "DEBIT" via scroll list 810, to identify that when a button so labeled is activated on an actual card, funds may be immediately authorized and debited from an associated debit account. Virtual representation of such a button label may be rendered onto virtual card 820 to provide feedback as to what such a button label may look like.

An additional product associated with a user's card may be labeled as, for example, "CREDIT" via scroll list 808, to identify that when a button so labeled is activated on an actual card, funds may be authorized from an associated credit account. However, such funds may not be immediately debited, but rather added to a credit balance that may be paid at a later date. Virtual representation of such a button label may be rendered onto virtual card 820 to provide feedback as to what such a button label may look like.

Virtual card 822 may be updated by GUI 800 when other aesthetic features (e.g., holographic link 812) are selected. Link 812, for example, may allow the user to link to various holographic images that may be network accessible (or otherwise accessible) to the kiosk. Once selected, virtual card 822 may immediately update the holographic image onto virtual card 822 for viewing. Other features (e.g., geometric features of a signature panel) may be designed. Text input boxes (e.g., boxes 814 and 816) may be utilized, for example, to design height and width features of a signature panel that may be displayed on a card. Once selected, virtual card 822 may immediately update the signature panel onto virtual card 822 for viewing.

Figure 9:
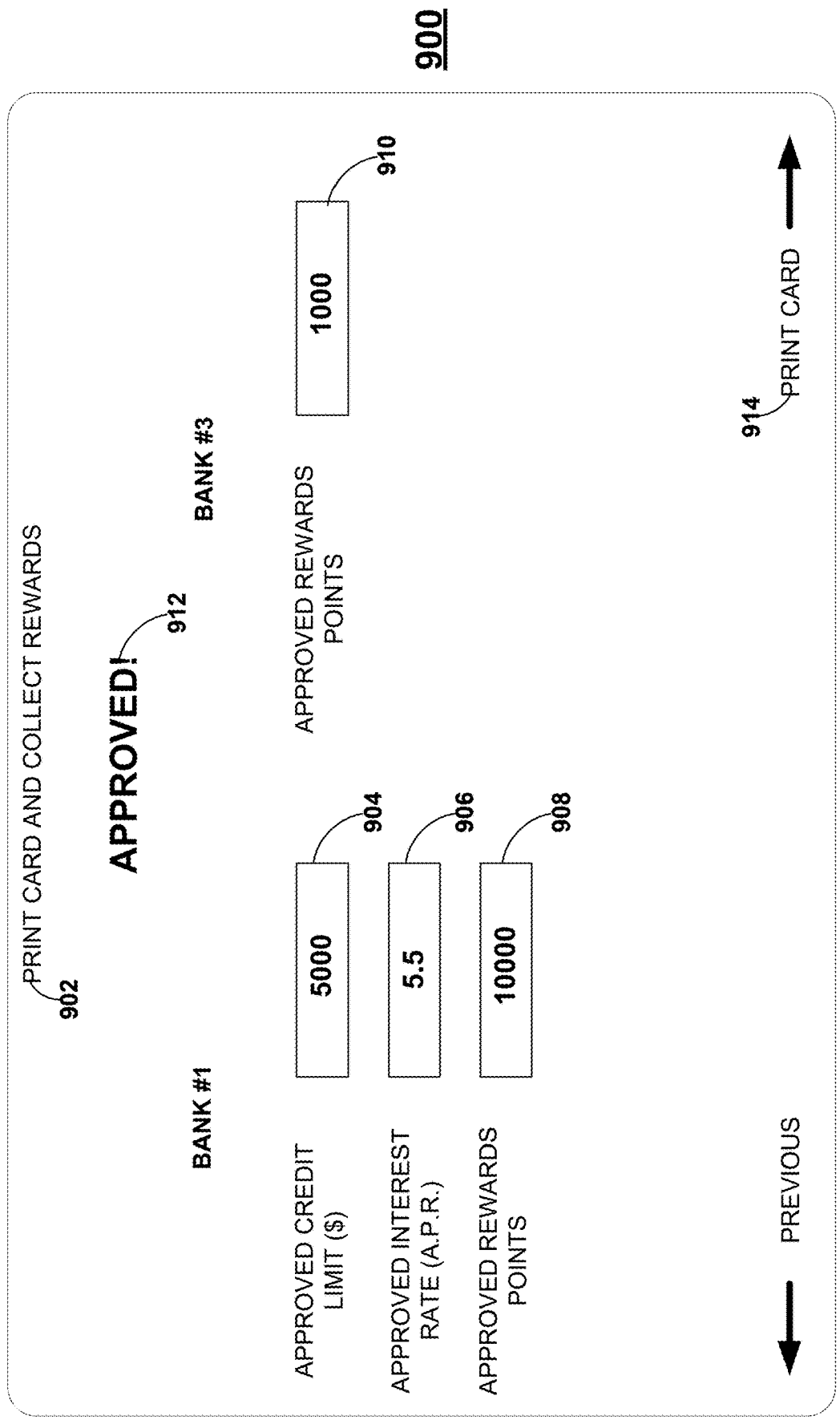
FIG. 9 is an illustration of display screens constructed in accordance with the principles of the present invention.

FIG. 9 shows GUI 900. GUI 900 may be rendered onto a display of a kiosk by a processor implemented within the kiosk. A processor may be executing application code (e.g., GUI application code) that is effective to display GUI 900 that may include command section 902 that displays a command (e.g., "PRINT CARD AND COLLECT REWARDS").

GUI 900 may be displayed as a result of a user's request to associate one or more products (e.g., a debit card product and a credit card product) with a new card. Accordingly, status field 912 may indicate the results of a user's request, which may include the results indicative of an approval or disapproval of the request.

For example, a user's request to associate a product with a new card may include a request that the product include a particular financial type, associated terms, and payment network branding (e.g., a M/C credit account with an associated credit limit and interest rate). The request may include a particular financial institution. Accordingly, for example, status field 912 may provide the results of a request being sent by the kiosk to a financial institution for approval of such a requested product. Status field 912 (or an additional status field) may also provide status indicators for other products that may have been requested (e.g., a VISA debit account from checking with over-draft protection provided by an associated savings account).

A user's requested association of one or more products with a new card may include incentives for such association(s). For example, incentives (e.g., rewards points 908 and 910) may be associated with a new card when one or more products are requested and authorized.

Once all functional and/or aesthetic features of a user's new card have been defined, navigational button (e.g., PRINT CARD 914) may be activated. In doing so, a blank card may be retrieved from within a kiosk that conforms to a particular card variety (e.g., particular hardware configuration) as requested by the user. The hardware configuration of the blank card may be programmed in accordance with a user defined configuration as specified by the user at a user interface of the kiosk (or as specified by the user at a remote location that is network accessible to an appropriate card development server) during a customization event.

The blank card may be delivered to a printer located within the kiosk. Accordingly, any aesthetic features (e.g., images, holograms, labels, signature panels, colors, patterns, textures, card specific data, and user specific data) that may have been defined by the user may be rendered onto the user's new card. Once complete, the user may collect his or her newly programmed and/or personalized card directly from the kiosk. Alternately, the user may request that the card be delivered to the user at a different location (e.g., the home address of the user).

Figure 10:
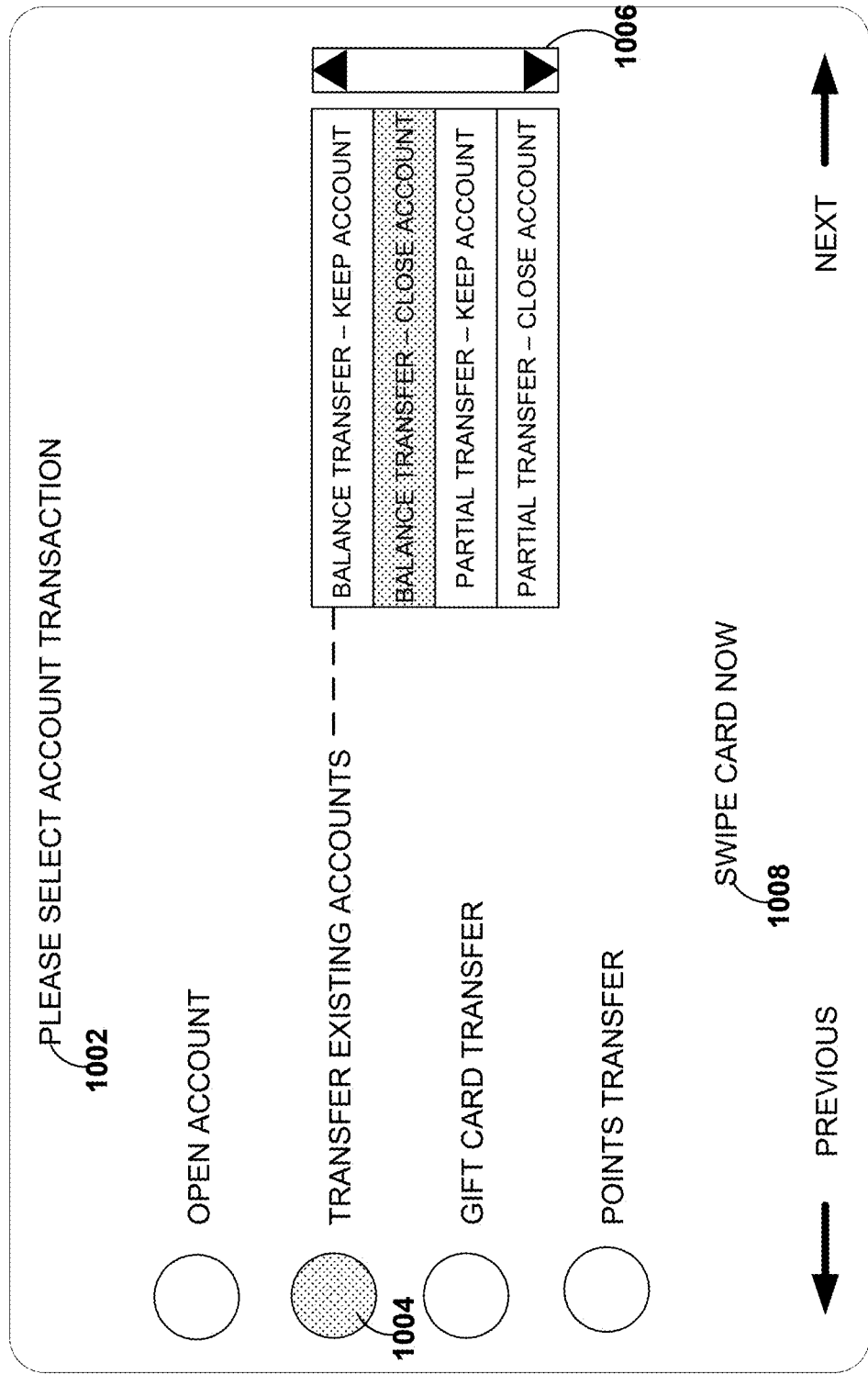
FIG. 10 is an illustration of display screens constructed in accordance with the principles of the present invention.

FIG. 10 shows GUI 1000. GUI 1000 may be rendered onto a display of a kiosk by a processor implemented within the kiosk. A processor may be executing application code (e.g., GUI application code) that is effective to display GUI 1000 that may include command section 1002 that displays a command (e.g., "PLEASE SELECT ACCOUNT TRANSACTION").

A user may wish to obtain a new card from a kiosk (or upgrade a current card), but may have one or more preexisting payment accounts. Accordingly, a user may select an account transaction (e.g., TRANSFER EXISTING ACCOUNTS 1004) to allow the user to transfer all or a portion of a preexisting account balance to a new product that may be associated with a new card (or a user's current card). Such a selection may be reflected by feedback (e.g., highlighted radio button 1004) that is provided to the user via GUI 1000 to confirm the user's selection.

A user may wish to close a preexisting account or leave a preexisting account open once a balance, or partial balance, transfer has been requested. Accordingly, for example, through appropriate selection via scroll list 1006 and associated mouse operations, a user may request that the preexisting account remain open or be closed irrespective of whether the full or partial balance is transferred from the preexisting account to the new product associated with the new or current card.

Once transfer of one or more accounts is requested, GUI 1000 may query the user for more information. For example, GUI 1000 may request that the user insert the user's preexisting card(s) into a card reader of the kiosk (e.g., via command 1008). In doing so, the kiosk may retrieve account information transferred during the card swipe that may be necessary to effect such account transfer(s). Alternately, a user may transfer account information into the kiosk via other means (e.g., manual, RFID, IC chip, infrared, or touch simulation).

Account transfer information may be programmed into a user's new card via programming facilities provided within the kiosk. Should a user wish to upgrade his or her current card with the account transfer information, for example, the user may present his or her current card to the kiosk to effect the transfer. For example, the user's current card may employ receivers (e.g., light sensors) that when placed against a programming area of a display of the kiosk, may be receptive to data transferred to the card via light pulses presented to the user's current card by the display's programming area. The user's current card may be programmed by other means (e.g., electromagnetic data transfer, RFID data transfer, infrared, or contact-based data transfer).

Appropriate status may be displayed by GUI 1000 as to the success or failure of the account transaction as requested by the kiosk. Such status may also reflect the success or failure of any authorizations that may be required by the one or more financial institutions involved with the transaction.

Figure 11:
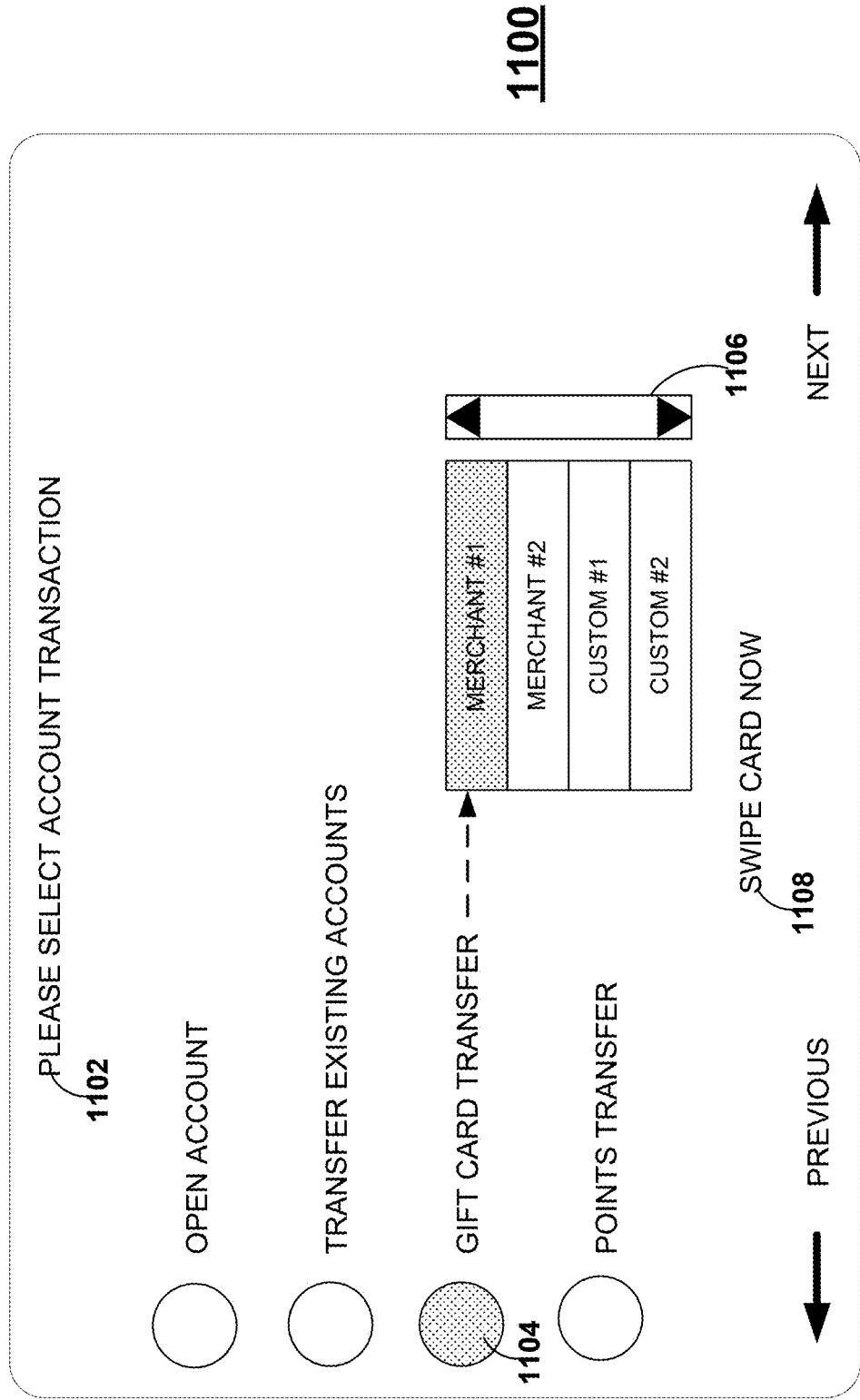
FIG. 11 is an illustration of display screens constructed in accordance with the principles of the present invention.

FIG. 11 shows GUI 1100. GUI 1100 may be rendered onto a display of a kiosk by a processor implemented within the kiosk. A processor may be executing application code (e.g., GUI application code) that is effective to display GUI 1100 that may include command section 1102 that displays a command (e.g., "PLEASE SELECT ACCOUNT TRANSACTION").

A variety of products (e.g., gift card products) may be associated with either of a new card or a user's current card. GUI 1100 may be utilized, for example, to allow a user to transfer dollar amounts associated with a preexisting gift card to one or more products that may be associated with a user's new or current card.

Scroll list 1106 and associated mouse operations, for example, may allow a user to select a gift card account that may be associated with one or more retail department stores. A dollar amount may be associated with such a gift card account. Should the user be in possession of a gift card, the user may present the gift card to the kiosk (e.g., the user may swipe the gift card through a magnetic stripe card reader of the kiosk) to ascertain account details (e.g., the dollar value that may be associated with the gift card) when commanded to do so (e.g., via command 1108). Alternately, the user may log into his or her online gift card account via, for example, a network browser that may be accessible from the kiosk.

Once a gift card account and related account information becomes known to the kiosk, the information may then be associated with the user's new or current card. For example, gift card account and related information may be programmed into a user's new card via, for example, programming facilities provided within the kiosk. Alternately, the user's current card may employ receivers (e.g., light sensors) that when placed against a programming area of a display of the kiosk, may be receptive to data transferred to the card via light pulses presented to the user's current card by the display's programming area. The user's current card may be programmed by other means (e.g., electromagnetic data transfer, RFID data transfer, infrared, or contact-based data transfer).

Figure 12:
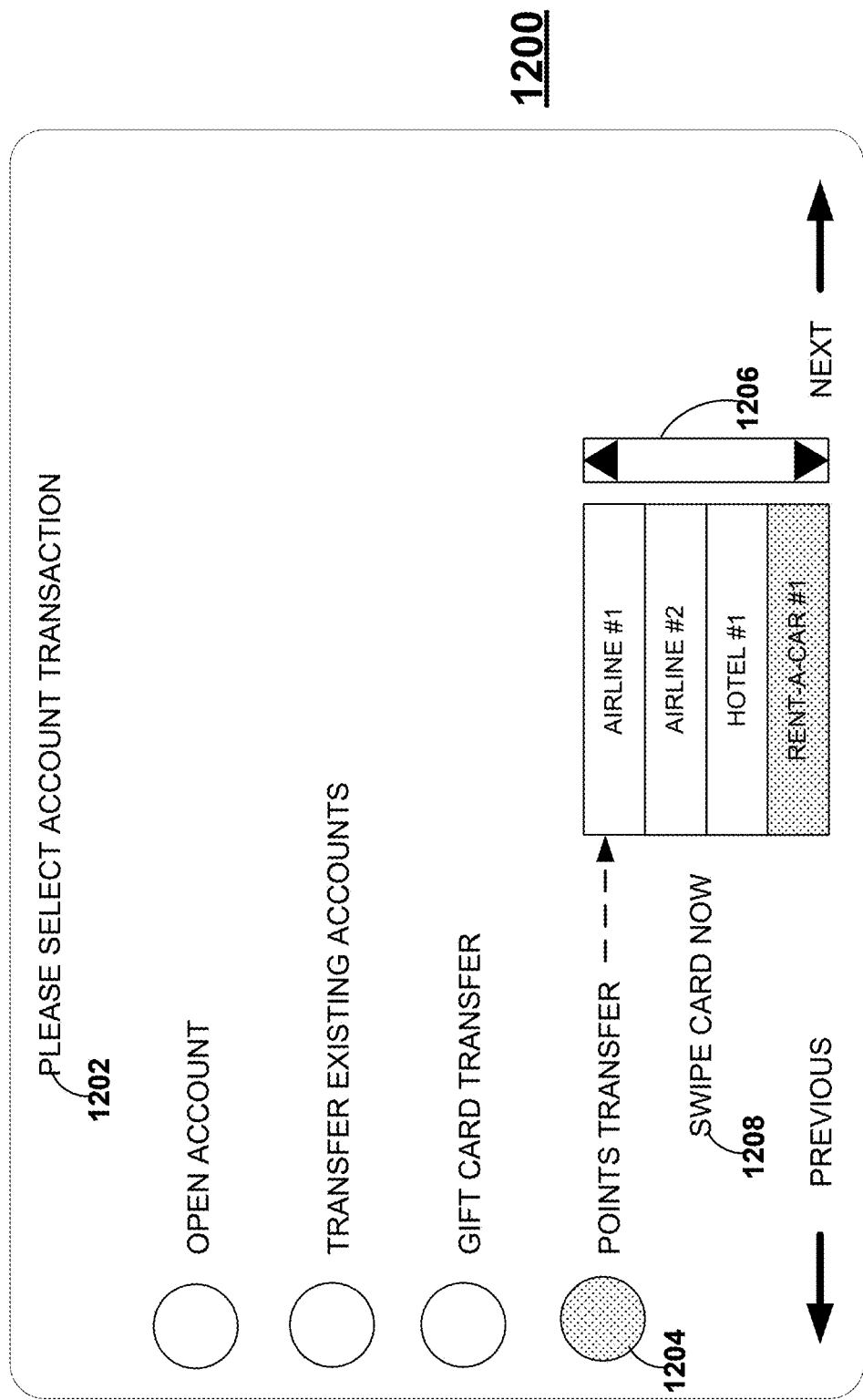
FIG. 12 is an illustration of display screens constructed in accordance with the principles of the present invention.

FIG. 12 shows GUI 1200. GUI 1200 may be rendered onto a display of a kiosk by a processor implemented within the kiosk. A processor may be executing application code (e.g., GUI application code) that is effective to display GUI 1200 that may include command section 1202 that displays a command (e.g., "PLEASE SELECT ACCOUNT TRANSACTION").

A variety of products (e.g., loyalty-based products) may be associated with either of a new card or a user's current card. GUI 1200 may be utilized, for example, to allow a user to transfer loyalty-based products (e.g., rewards points) that may be associated with one or more of a user's rewards programs to one or more products that may be associated with a user's new or current card.

Scroll list 1206 and associated mouse operations, for example, may allow a user to select a rewards program that may be associated with one or more service-oriented organizations (e.g., airlines or rental car agencies). A number of rewards points may be associated with such a service account. Should the user be in possession of a rewards card, the user may present the rewards card to the kiosk (e.g., the user may swipe the rewards card through a magnetic stripe card reader of the kiosk) to ascertain account details (e.g., the points value that may be associated with the rewards card) when commanded to do so (e.g., via command 1208). Alternately, the user may log into his or her online rewards account via, for example, a network browser that may be accessible from the kiosk.

Once a rewards account and related account information becomes known to the kiosk, the information may then be associated with the user's new or current card. For example, rewards account and related information may be programmed into a user's new card via, for example, programming facilities provided within the kiosk. Alternately, the user's current card may employ receivers (e.g., light sensors) that when placed against a programming area of a display of the kiosk, may be receptive to data transferred to the card via light pulses presented to the user's current card by the display's programming area. The user's current card may be programmed by other means (e.g., electromagnetic data transfer, RFID data transfer, infrared, or contact-based data transfer).

Figure 13:
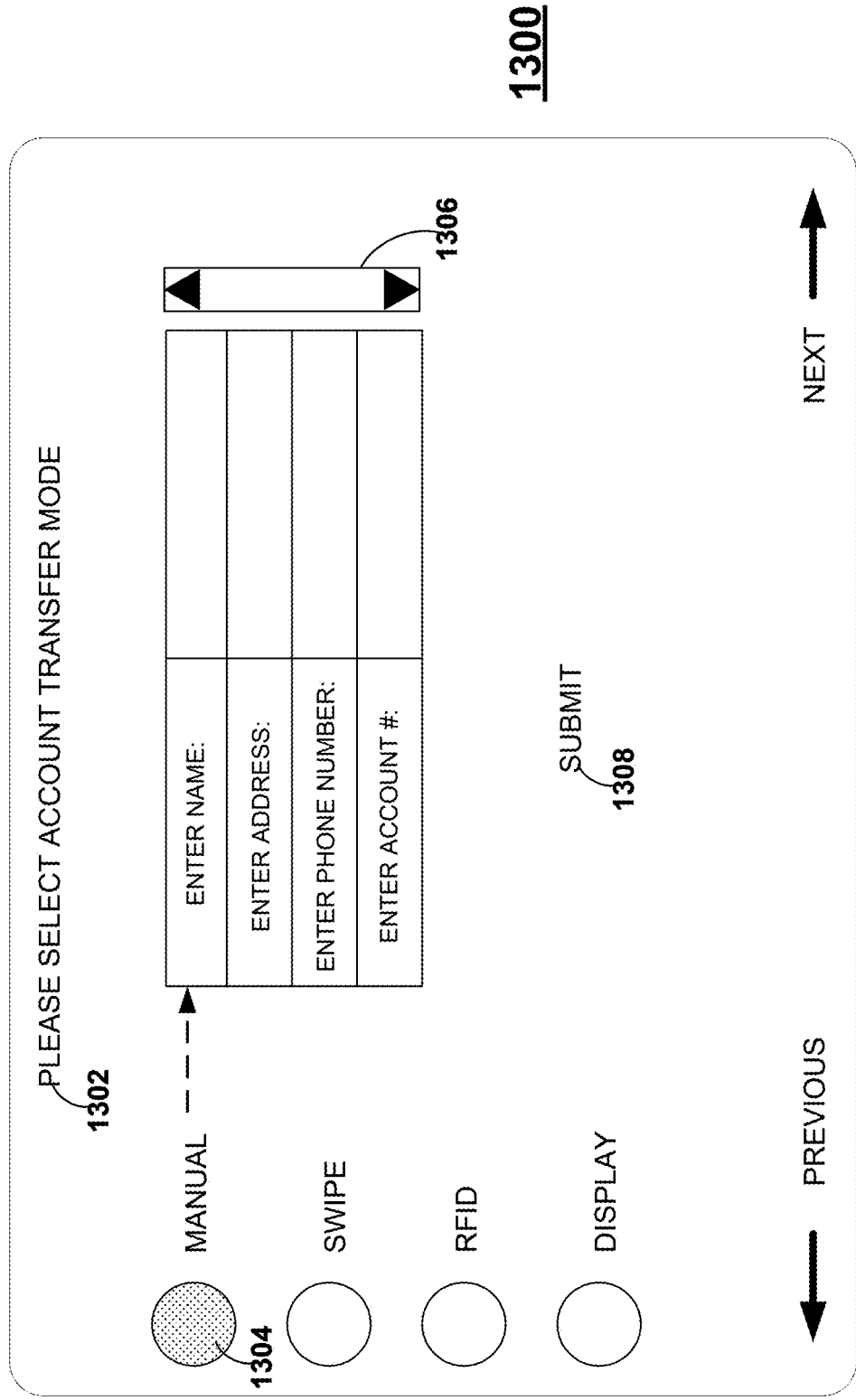
FIG. 13 is an illustration of display screens constructed in accordance with the principles of the present invention.

FIG. 13 shows GUI 1300. GUI 1300 may be rendered onto a display of a kiosk by a processor implemented within the kiosk. A processor may be executing application code (e.g., GUI application code) that is effective to display GUI 1300 that may include command section 1302 that displays a command (e.g., "PLEASE SELECT ACCOUNT TRANSFER MODE").

GUI 1300, for example, may be displayed when a user wishes to manually transfer information relating to a preexisting account into a kiosk. Feedback (e.g., highlighted radio button 1304) may confirm such a user's desire. A preexisting account may relate to any number of account types (e.g., credit, debit, gift, installment account) and may be associated with any number of payment network brands (e.g., VISA, M/C, American Express) as well with any number of financial institutions.

Account data transfer may begin with the user manually typing information (e.g., name, address, and account number) into scroll list 1306. Once complete, the user may submit the account information to the kiosk (e.g., via command 1308). Prior to being associated with products of a new card or a user's current card, the account information may be verified and authenticated via network facilities that may be available to the kiosk.

Figure 14:
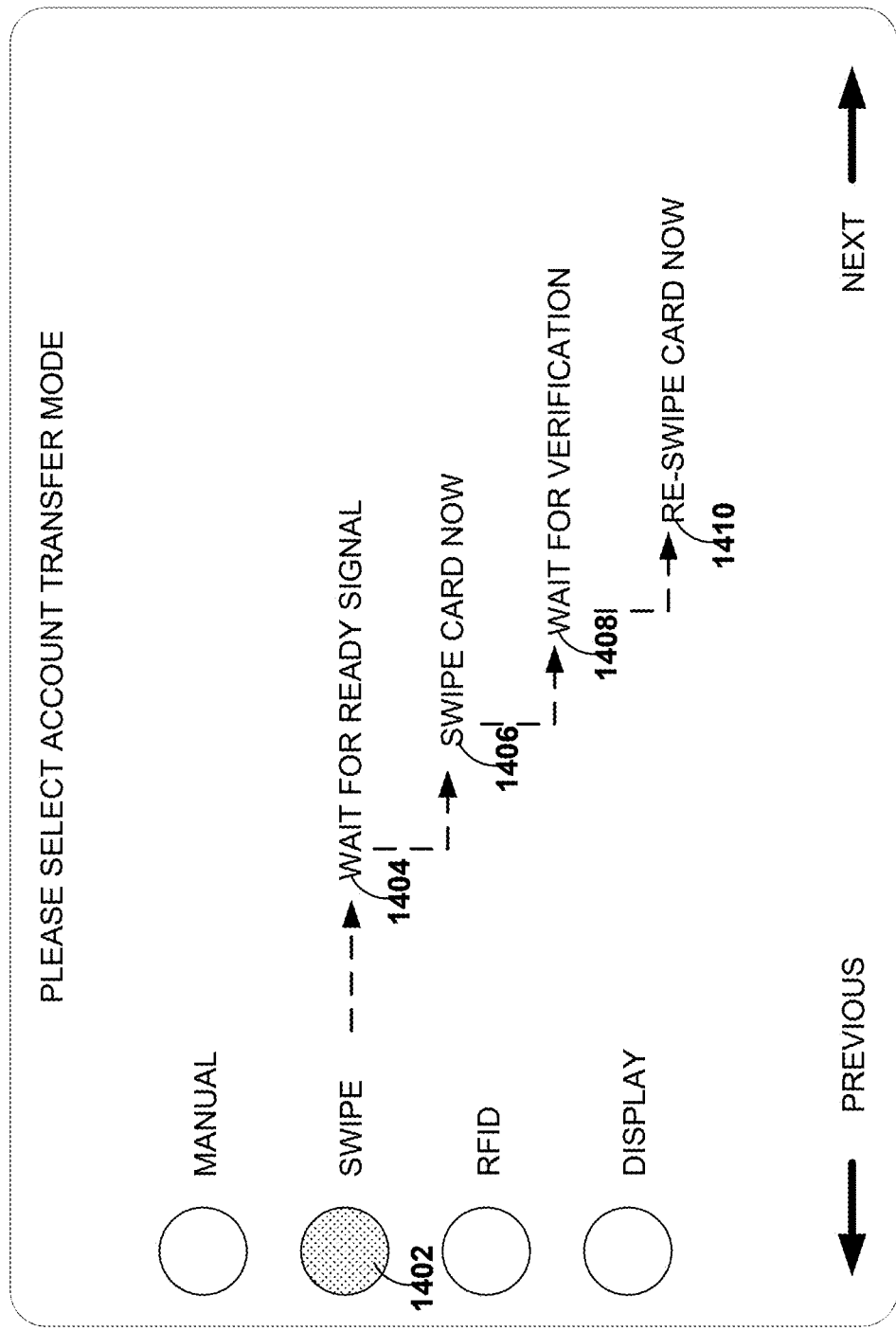
FIG. 14 is an illustration of display screens constructed in accordance with the principles of the present invention.

FIG. 14 shows GUI 1400, which may be used by a user wishing to transfer account information to a kiosk via, for example, electromagnetic data transfer as confirmed by feedback information (e.g., highlighted radio button 1402). Such an account data transfer mode may be preferred by a user should the user be in possession of any card having a magnetic stripe and/or a magnetic stripe emulator capable of conveying information electromagnetically. A user may be prompted by a kiosk through a series of commands (e.g., commands 1404-1408) to effect the account information transfer. Should an additional transfer be necessary, optional command (e.g., command 1410) may be presented by GUI 1400 to prompt the user to present the card once again to the kiosk.

Figure 15:
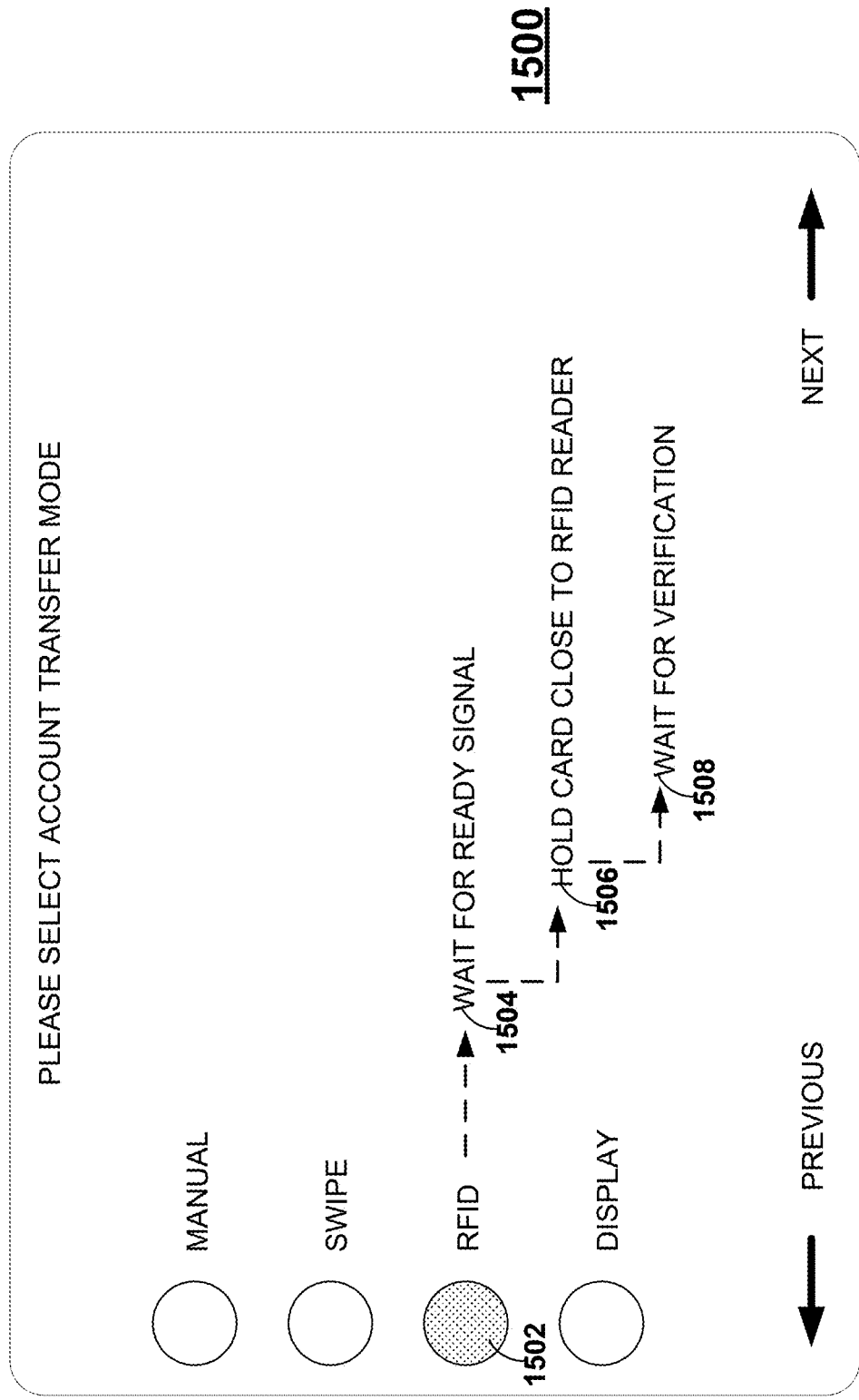
FIG. 15 is an illustration of display screens constructed in accordance with the principles of the present invention.

FIG. 15 shows GUI 1500, which may be used by a user wishing to transfer account information to a kiosk via, for example, RFID as confirmed by feedback information (e.g., highlighted radio button 1502). Such an account data transfer mode may be preferred by a user should the user be in possession of any card having RFID capability. A user may be prompted by a kiosk through a series of commands (e.g., commands 1504-1508) to effect the account information transfer.

Figure 16:
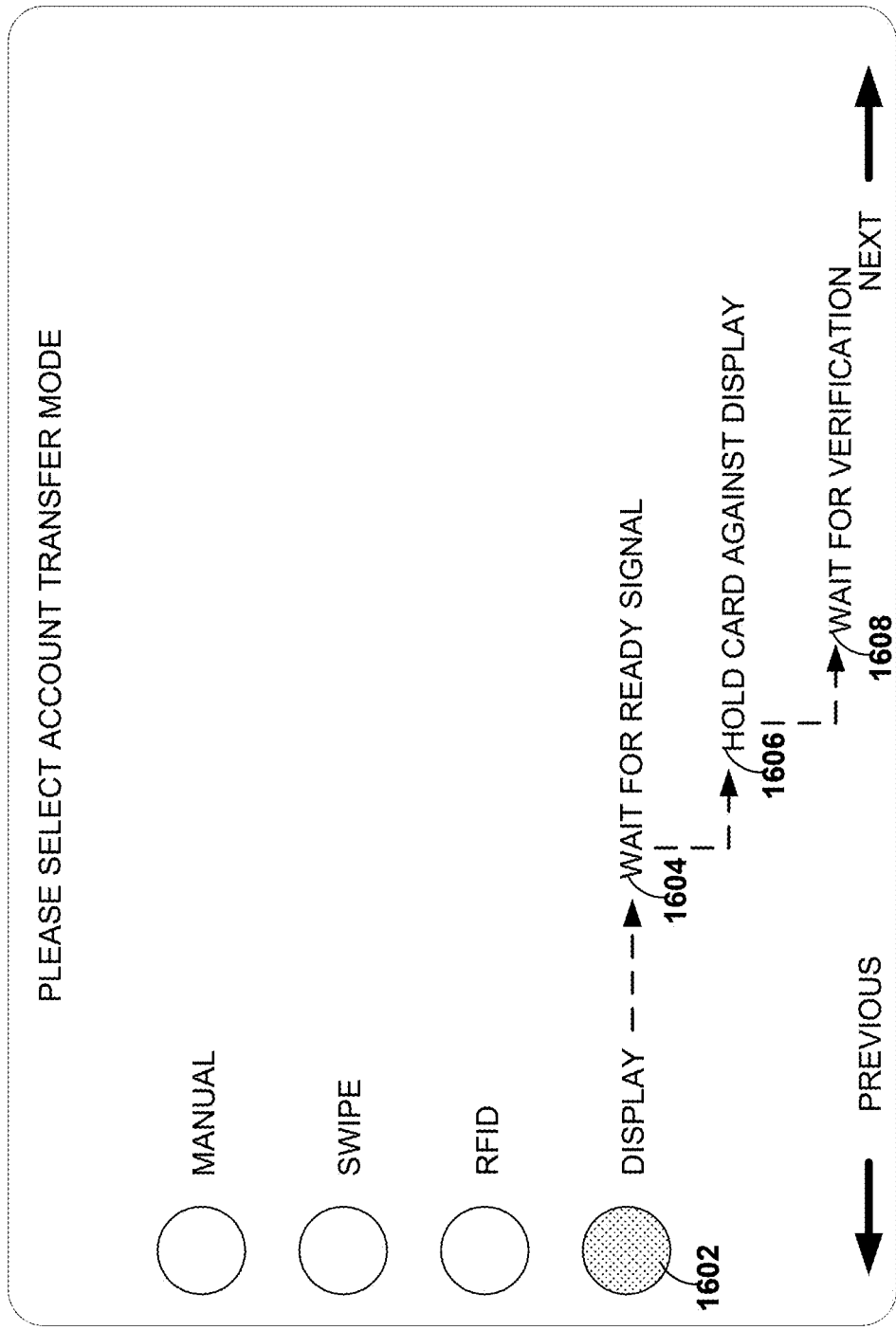
FIG. 16 is an illustration of display screens constructed in accordance with the principles of the present invention.

FIG. 16 shows GUI 1600, which may be used by a user wishing to transfer account information to a kiosk via, for example, the display of the kiosk as confirmed by feedback information (e.g., highlighted radio button 1602). Such an account data transfer mode may be preferred by a user should the user be in possession of any card having touch simulation technology. For example, a card may provide electronics that may simulate human touch (e.g., the card may generate a change in capacitance that may be sensed by a touch-sensitive display). Through a series of simulated touches, a card may transmit a series of data bits to a touch-sensitive display of a kiosk, where the data bits transmitted may be understood by the kiosk as account information. A user may be prompted by a kiosk through a series of commands (e.g., commands 1604-1608) to effect the account information transfer.

Persons skilled in the art will appreciate that other data transfer modes may be used. For example, cards employing IC technology (e.g., EMV technology) may transfer data to a kiosk that provides corresponding EMV chip contacts that may be utilized for data transfer from a card to the kiosk.

Figure 17:
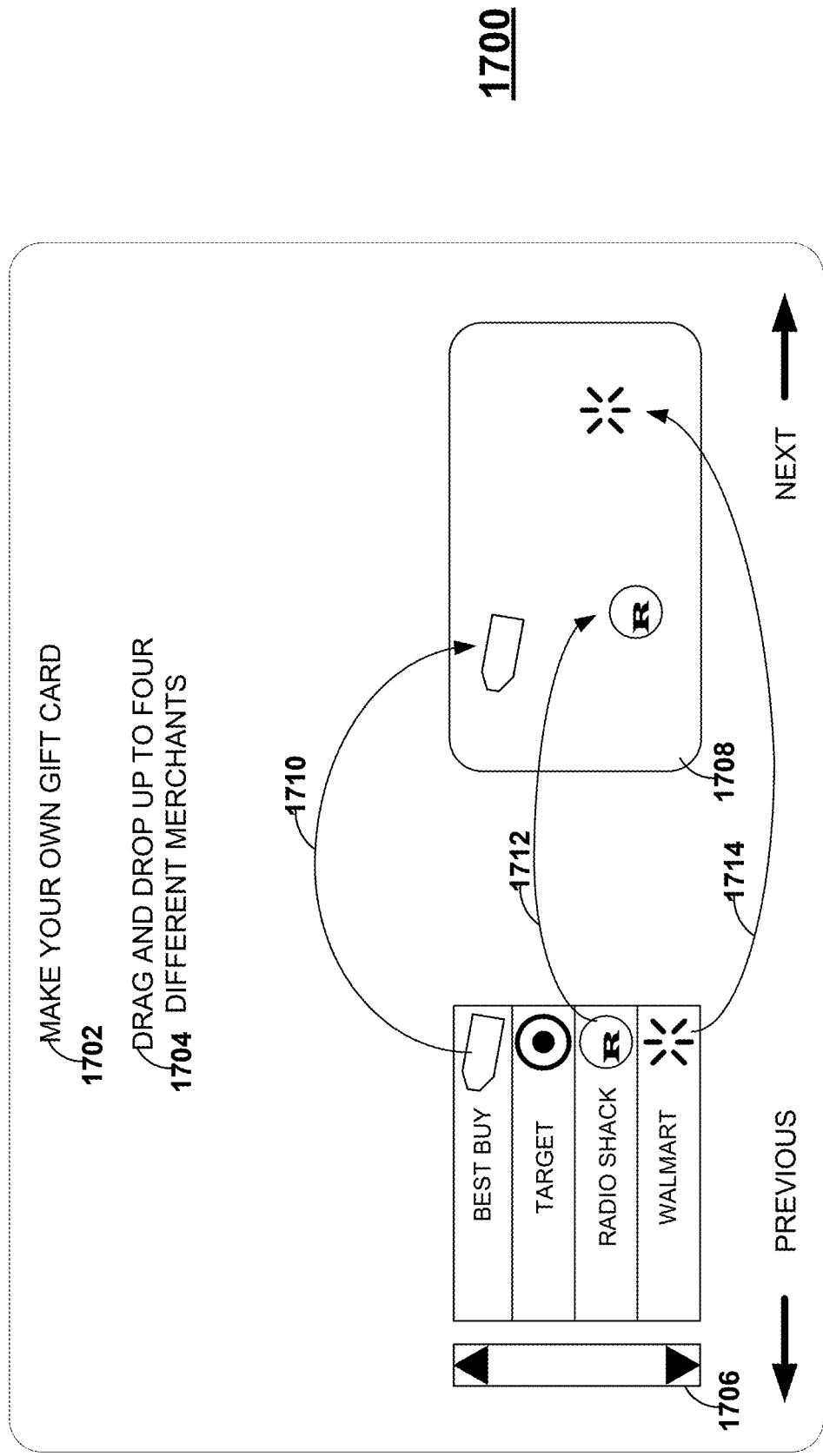
FIG. 17 is an illustration of display screens constructed in accordance with the principles of the present invention.

FIG. 17 shows GUI 1700. GUI 1700 may be rendered onto a display of a kiosk by a processor implemented within the kiosk. A processor may be executing application code (e.g., GUI application code) that is effective to display GUI 1700 that may include command section 1702 that displays a command (e.g., "MAKE YOUR OWN GIFT CARD") and sub-command section 1704 that displays a sub-command (e.g., "DRAG AND DROP UP TO FOUR DIFFERENT MERCHANTS").

GUI 1700 may be utilized by users wishing to add products (e.g., gift card products) to a new card or a user's current card. Virtual card 1708, for example, may represent either a new card or a user's current card. Scroll list 1706 may be utilized by a user at a kiosk to scroll through a list of products that may be associated with virtual card 1708.

For example, a user wishing to associate one or more gift products (e.g., a BEST BUY gift product) with virtual card 1708 may utilize drag-and-drop operation 1710. For example, a user may mouse over to an icon within scroll list 1706 that is representative of a merchant of interest (e.g., BEST BUY). A user may then execute, for example, a series of mouse operations to drag-and-drop the icon onto virtual card 1708. Feedback indicating a successful drag-and-drop operation may include a rendering of a corresponding icon on virtual card 1708 after the drag-and-drop operation is complete. Other drag-and-drop operations (e.g., drag-and-drop operations 1712-1714) may be additionally executed until the user is satisfied with the products associated with virtual card 1708 as confirmed by the icons rendered onto virtual card 1708.

Virtual card 1708 may be representative of a user's current card. Accordingly, any icons displayed onto virtual card 1708 may be displayed as a result of an interrogation performed by a kiosk on a user's current card. For example, products (e.g., gift card products) may be associated with a user's current card. A kiosk may interrogate a user's current card in order to ascertain such preexisting gift card products and may then render icons representative of such preexisting gift card products onto virtual card 1708 for monitoring by a user. A user's current card may be equipped with any number of transmission capabilities (e.g., electromagnetic, RFID, touch simulation, infrared, and EMV chip) to transmit information related to such preexisting gift card products in response to such an interrogation.

FIG. 18 shows GUI 1800. A sub-command (e.g., sub-command 1802) may be displayed by GUI 1800 to allow a user to assign dollar values to gift card products that may be associated with a new virtual card. Alternately, GUI 1800 may be displayed in order to provide the user with a listing of preexisting gift card products and dollar amounts that may be associated with such preexisting gift card products on a user's current card. Accordingly, a user may either alter a preexisting gift card amount, or may enter a new gift card amount, into text input boxes (e.g., 1804-1808) as required.

Figure 19:
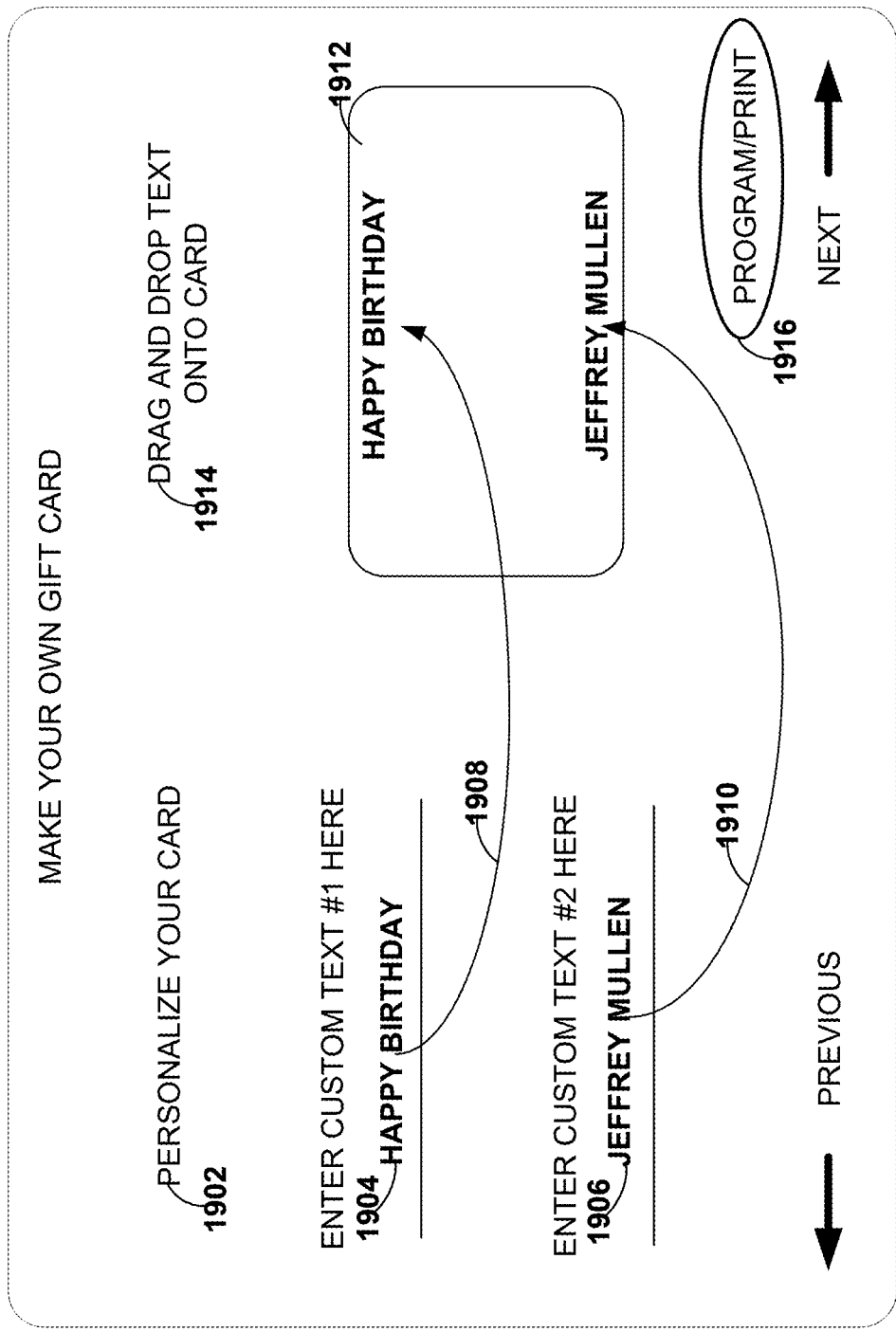
FIG. 19 is an illustration of display screens constructed in accordance with the principles of the present invention.

FIG. 19 shows GUI 1900. A sub-command (e.g., sub-command 1902) may be displayed by GUI 1900, for example, to provide direction and capabilities to a user to personalize a new card (e.g., a new gift card). For example, text input boxes 1904 and 1906 may be utilized by GUI 1900 to allow a user to type one or more custom messages (e.g., HAPPY BIRTHDAY). Additional functionality provided by GUI 1900 may, for example, provide drag-and-drop operations (e.g., operations 1908 and 1910) to allow the user to drag custom text messages onto virtual card 1912 as directed by a sub-command (e.g., sub-command 1914).

Figure 20:
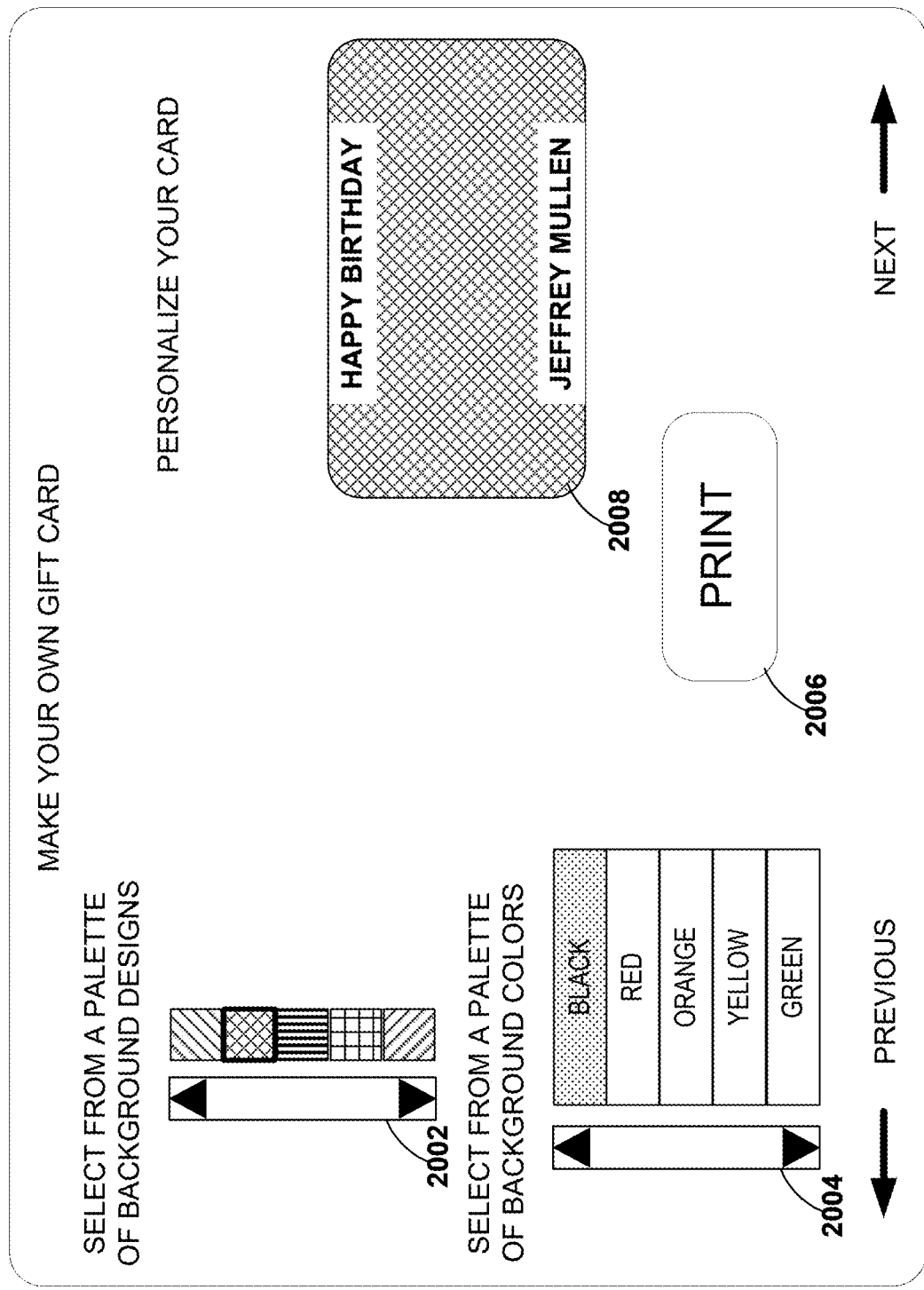
FIG. 20 is an illustration of display screens constructed in accordance with the principles of the present invention.

Other aesthetic features (e.g., color, texture, background color/design, and various images) may be further rendered onto a virtual card. For example, such applications may be provided by GUI 2000 of FIG. 20. Scroll list 2002 may provide, for example, a palette of background designs that may be applied to virtual card 2008. By using a series of input commands (e.g., mouse events) scroll list 2002 may be navigated to locate and apply an acceptable background design. Feedback may be provided to the user (e.g., automatic updates to the background design rendered onto virtual card 2008 by GUI 2000) to allow the user to instantly view what such a background design might look like. Similarly, for example, scroll list 2004 may be navigated to locate and apply an acceptable background color that, for example, may be applied as a color used for the background design as selected via scroll list 2002.

Once all of the aesthetic and/or functional features of the new card have been attributed to virtual card 2008, a user may send a print/program job (e.g., by selecting command button 2006) to a printer/programmer that may be implemented within the kiosk. For example, a configuration description that defines the functional operation of virtual card 2008 may be transmitted to a programming facility within the kiosk to program (e.g., via IR programming) a blank card contained within the kiosk. Any aesthetic features that may have been applied to virtual card 2008 may be rendered onto the card by a printing facility that may be implemented within the kiosk. The fully functional and personalized card, for example, may then be delivered to the user from the kiosk for immediate use by the user.

Figure 21:
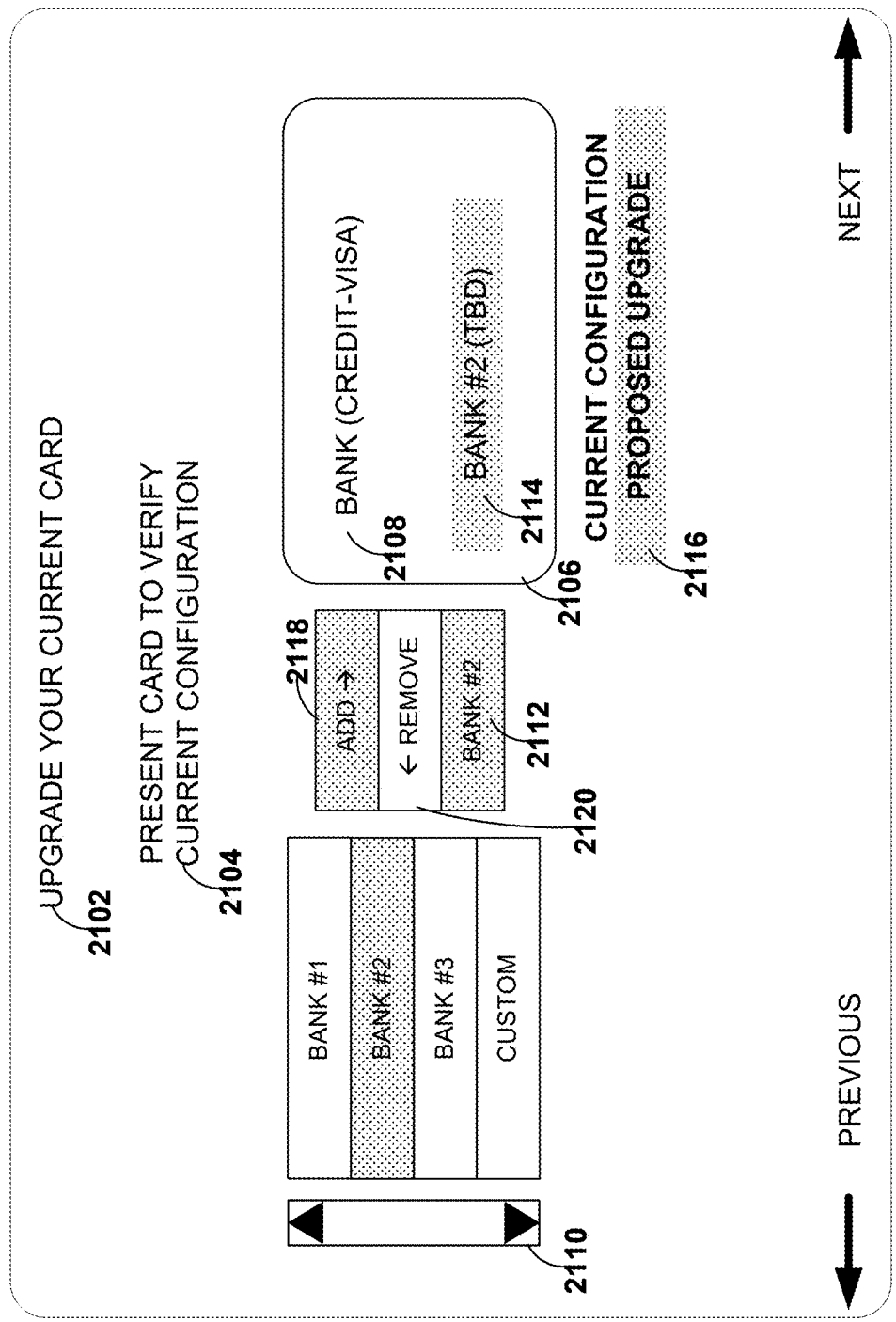
FIG. 21 is an illustration of display screens constructed in accordance with the principles of the present invention.

FIG. 21 shows GUI 2100. GUI 2100 may be rendered onto a display of a kiosk by a processor implemented within the kiosk. A processor may be executing application code (e.g., GUI application code) that is effective to display GUI 2100 that may include command section 2102 that displays a command (e.g., "UPGRADE YOUR CURRENT CARD").

GUI 2100 may be displayed as a result of a user's request to change (e.g., upgrade, delete, or replace) products that may be associated with a user's current card. A sub-command (e.g., sub-command 2104) may be provided by GUI 2100 to instruct the user to present his or her current card to the kiosk for interrogation. For example, a user's current card may be equipped with a magnetic stripe (or a device that may emulate a magnetic stripe). Accordingly, a user may insert the card into a card reader (e.g., a magnetic stripe reader) of the kiosk so that a description of the current configuration of the user's current card may be transmitted to the kiosk from the card via electromagnetic data.

Alternately, a user's current card may be equipped with touch simulation electronics that may simulate a human touch (e.g., electronics, that when activated, may indicate to a touch-sensitive display that the display has been touched by a human finger). In so doing, a user may present his or her current card to an interrogation region of a display of the kiosk and transmit information to the kiosk via the interrogation region as a series of simulated touches. As a result, information indicative of the current configuration of the user's current card may be communicated to the kiosk via a series of simulated touches that may be understood by the kiosk as a series of configuration data bits. Persons of ordinary skill will appreciate that other means of communicating configuration data bits (e.g., RFID communication or contact-based communication) may be used.

GUI 2100, for example, may allow a user to monitor a card's current configuration by displaying results of the interrogation. For example, a user may verify that a particular product (e.g., a VISA credit account) may be currently associated with the user's current card. Such a verification may be reported to the user via update region 2108 that may include a listing of all products currently associated with the user's current card.

A user may wish to make changes to the current configuration of the user's current card. Accordingly, for example, a user may choose to add products to the user's current card. GUI 2100 may be used, for example, to select one or more additional products to be associated with the user's current card.

For example, the user may navigate through a list of products (e.g., product providers) via scroll list 2110 that may offer products of interest to the user. Any selected providers may be updated to the user through feedback provided by selection confirmation area 2112 of GUI 2100. A further mouse operation (e.g. mouse click within region 2118) may be effective to move a selected object within selection confirmation area 2112 onto upgrade region 2114 of virtual card 2106. In so doing, a user may verify through feedback which, if any, product providers have been added to virtual card 2106.

GUI 2100, for example, may be used to select one or more products to be disassociated from the user's current card. For example, the user may use mouse operations (e.g., mouse clicks) to select currently associated products within region 2108. Any selected products may be updated to the user through feedback provided by selection confirmation area 2112 of GUI 2100. A further mouse operation (e.g. mouse click within region 2120) may be effective to remove a selected object from virtual card 2106. In so doing, a user may verify through feedback which, if any, products have been removed from virtual card 2106.

Figure 22:
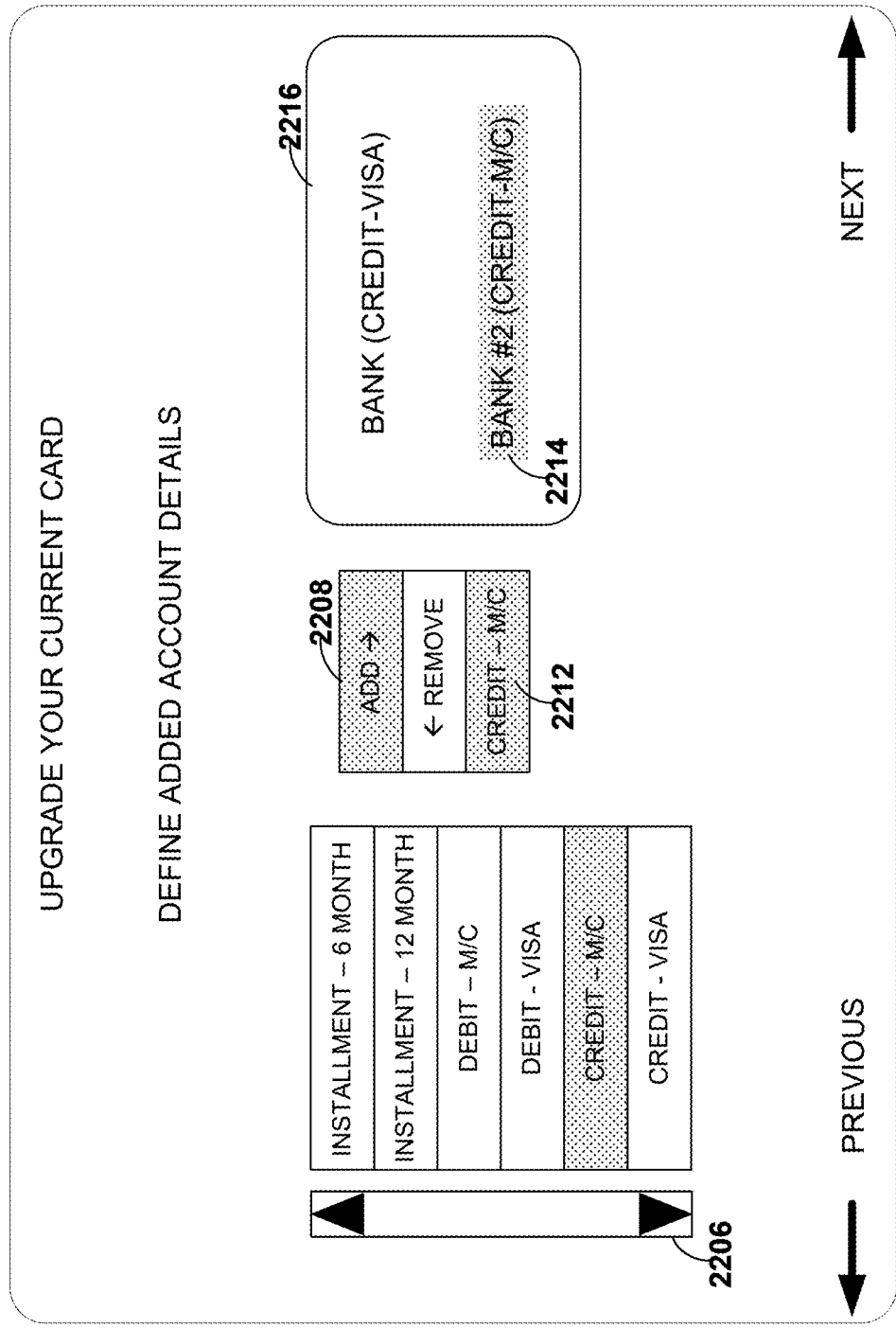
FIG. 22 is an illustration of display screens constructed in accordance with the principles of the present invention.

FIG. 22 shows GUI 2200, which may be used, for example, to further define one or more additional products to be associated with the user's current card. For example, the user may navigate through a list of products (e.g., financial types) via scroll list 2206. Any selected financial types may be updated to the user through feedback provided by selection confirmation area 2212 of GUI 2200. A further mouse operation (e.g. mouse click within region 2208) may be effective to further define account details of products (e.g., product providers) that may have been previously added to upgrade region 2214 of virtual card 2216. In so doing, a user may verify through feedback which, if any, product providers and associated financial types have been added to virtual card 2216.

Figure 23:
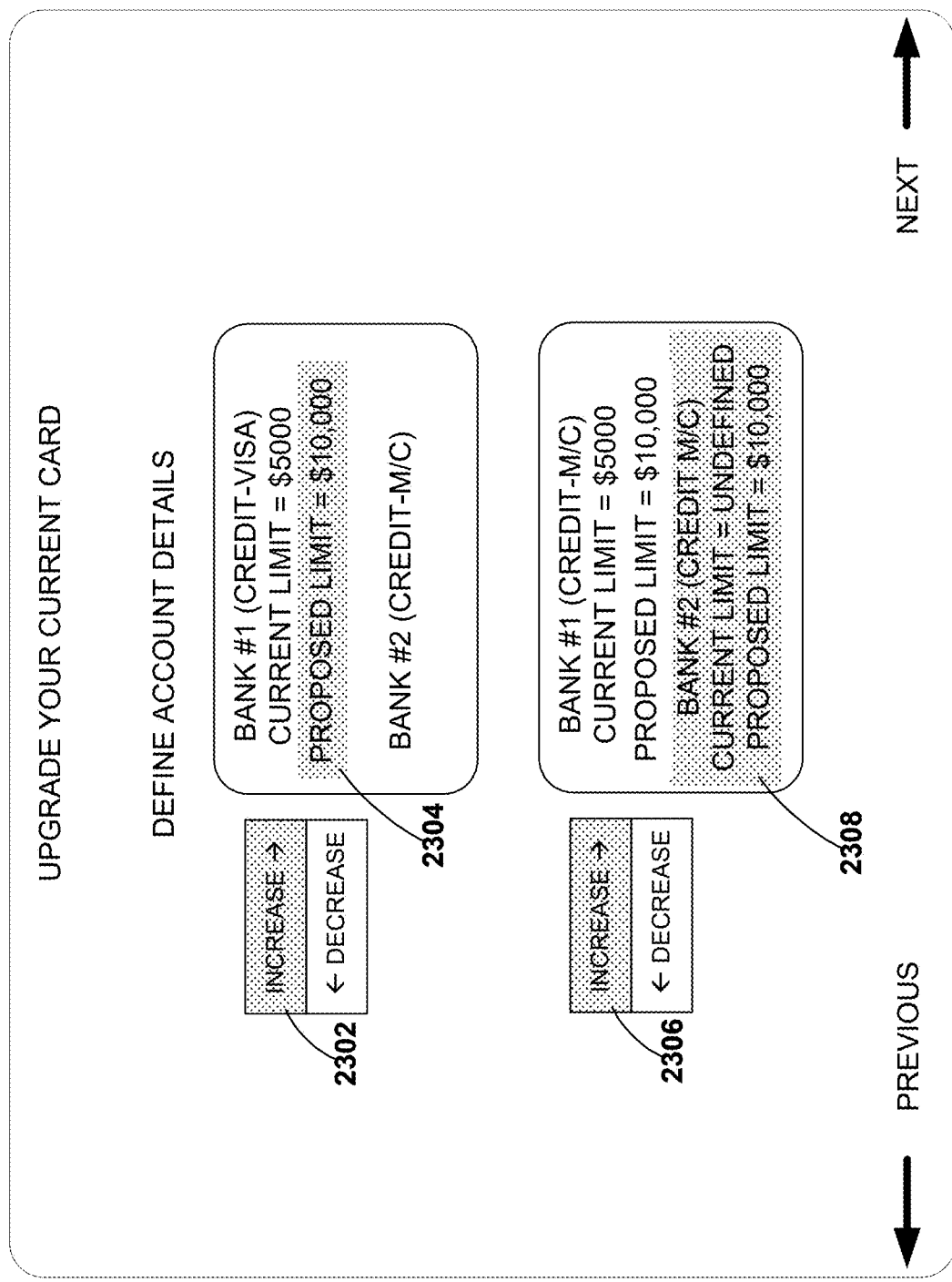
FIG. 23 is an illustration of display screens constructed in accordance with the principles of the present invention.

FIG. 23 shows GUI 2300, which may be used, for example, to further define one or more additional products to be associated with the user's current card. For example, the user may wish to select details of a term (e.g., credit limit) that may be associated with a product (e.g., financial type) that may have been added to the user's current card. A mouse operation (e.g. mouse click within region 2306) may be effective to, for example, increase a credit limit of a financial type previously added to the user's current card. Accordingly, a user may verify through feedback (e.g., region 2308) details of any product providers, associated financial types (e.g., M/C credit), and credit limit (e.g., $10,000) that may have been added to the user's current card.

GUI 2300, for example, may redefine (e.g., delete, upgrade, or downgrade) details of products that may already be associated with a user's current card. For example, a mouse operation (e.g. mouse click within region 2302) may be effective to, for example, increase a credit limit of a financial type already part of the user's current card. Accordingly, a user may verify through feedback (e.g., region 2304) details of any changes to terms of existing products that may have been associated with the user's current card. Persons skilled in the art will appreciate that other terms (e.g., interest rate, payback period, and payment due date) may be similarly modified and/or added via GUI 2300.

Figure 24:
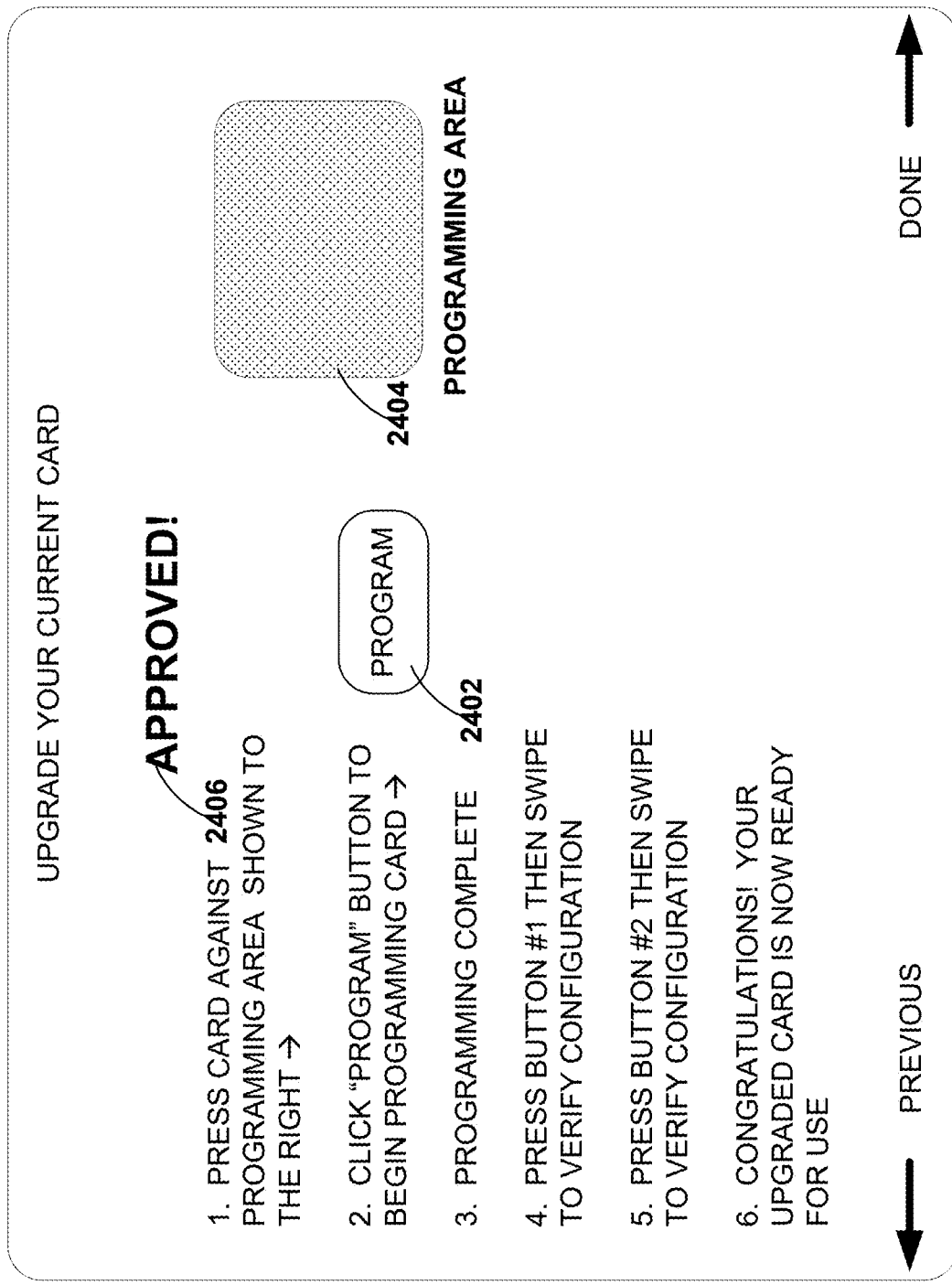
FIG. 24 is an illustration of display screens constructed in accordance with the principles of the present invention.

FIG. 24 shows GUI 2400, which may used to provide feedback to the user (e.g., approval or disapproval of the requested product additions/upgrades). For example, a kiosk may allow users to apply and request approval for one or more upgrades that are to be associated with a user's current card. Accordingly, for example, region 2406 may provide such approval verification for such upgrades prior to their association to a user's current card.

GUI 2400, for example, may allow a user to associate the approved upgrades with the user's current card. For example, a user's current card may be configured with one or more light sensors that may be sensitive to, for example, varying light intensities and/or colors. Accordingly, a user's current card may be pressed against programming area 2404 to receive information from programming area 2404 that may be presented as varying light intensity and/or varying light color by GUI 2400. Such varying light intensity and/or color may be understood by the light sensors as a series of configuration data bits that may be effective to program the user's current card with the approved additions and/or upgrades. Persons skilled in the art will appreciate that a user's current card may be programmed any number of different ways (e.g., electromagnetic data transfer, RFID, infrared, or contact-based data transfer).

Program verification of the newly upgraded card may be performed via GUI 2400 and associated peripherals of a kiosk. For example, a user may have added one or more new products (e.g., multiple credit accounts) to the user's current card. The newly added products may be associated with the user's current card by associating a payment account number with the product as well as any additional data (e.g., expiration date, security codes, and discretionary data).

Further, a user may have associated the one or more newly added products with manual interfaces (e.g., buttons) on the user's current card. In doing so, a button may be pressed to prepare the user's current card to communicate information related to the pressed button when the user's card is inserted into a card reader (e.g., swiped through a magnetic stripe card reader). Accordingly, for example, a user may press a first button on the user's current card and then swipe the card through a magnetic stripe reader of the kiosk. In response, the kiosk may verify that data corresponding to the newly added product is being transmitted (e.g., by a magnetic stripe emulation device) correctly by the user's current card. Other data corresponding to other newly added/upgraded products may be similarly verified.

Figure 25:
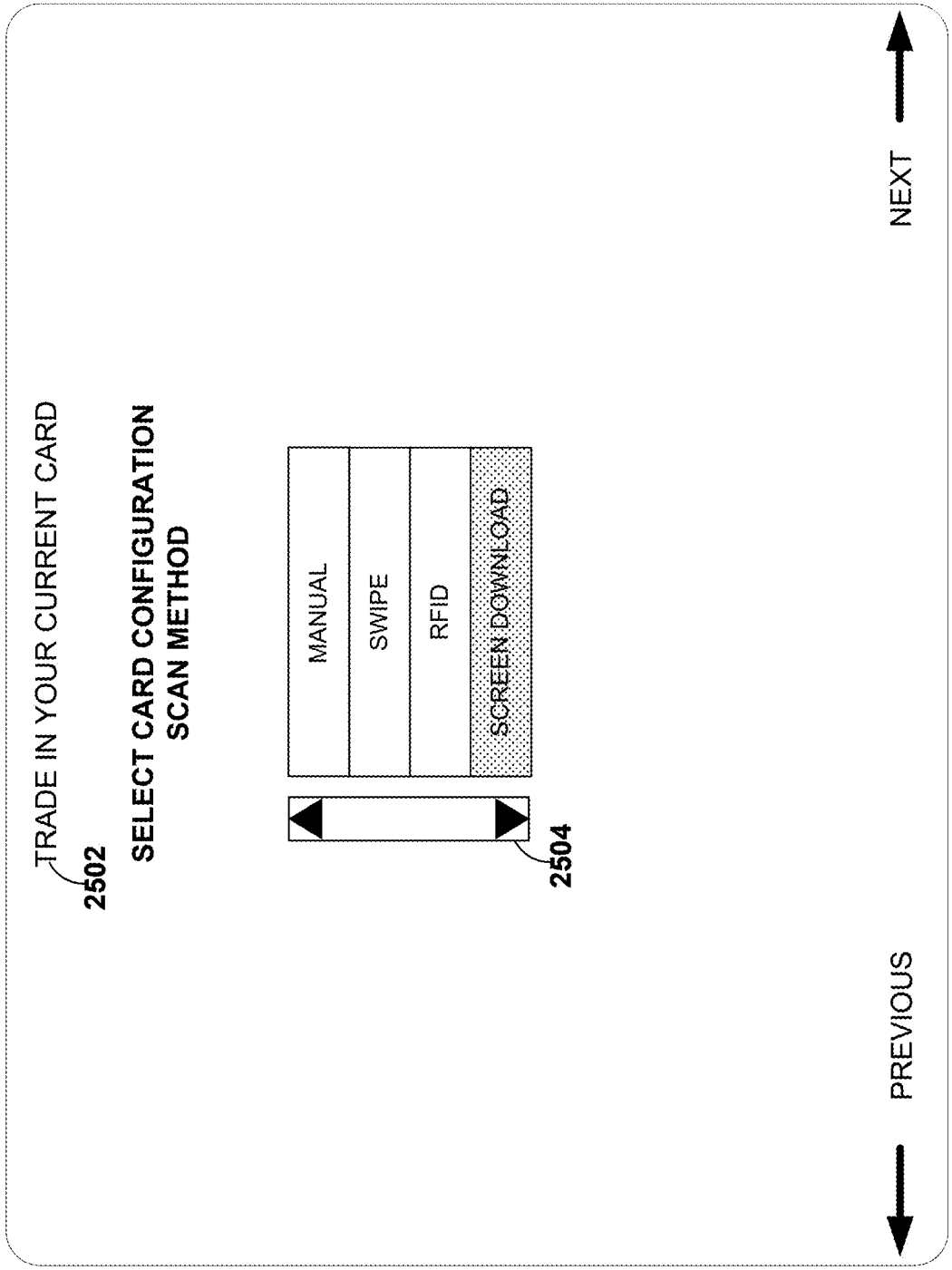
FIG. 25 is an illustration of display screens constructed in accordance with the principles of the present invention.
Figure 26:
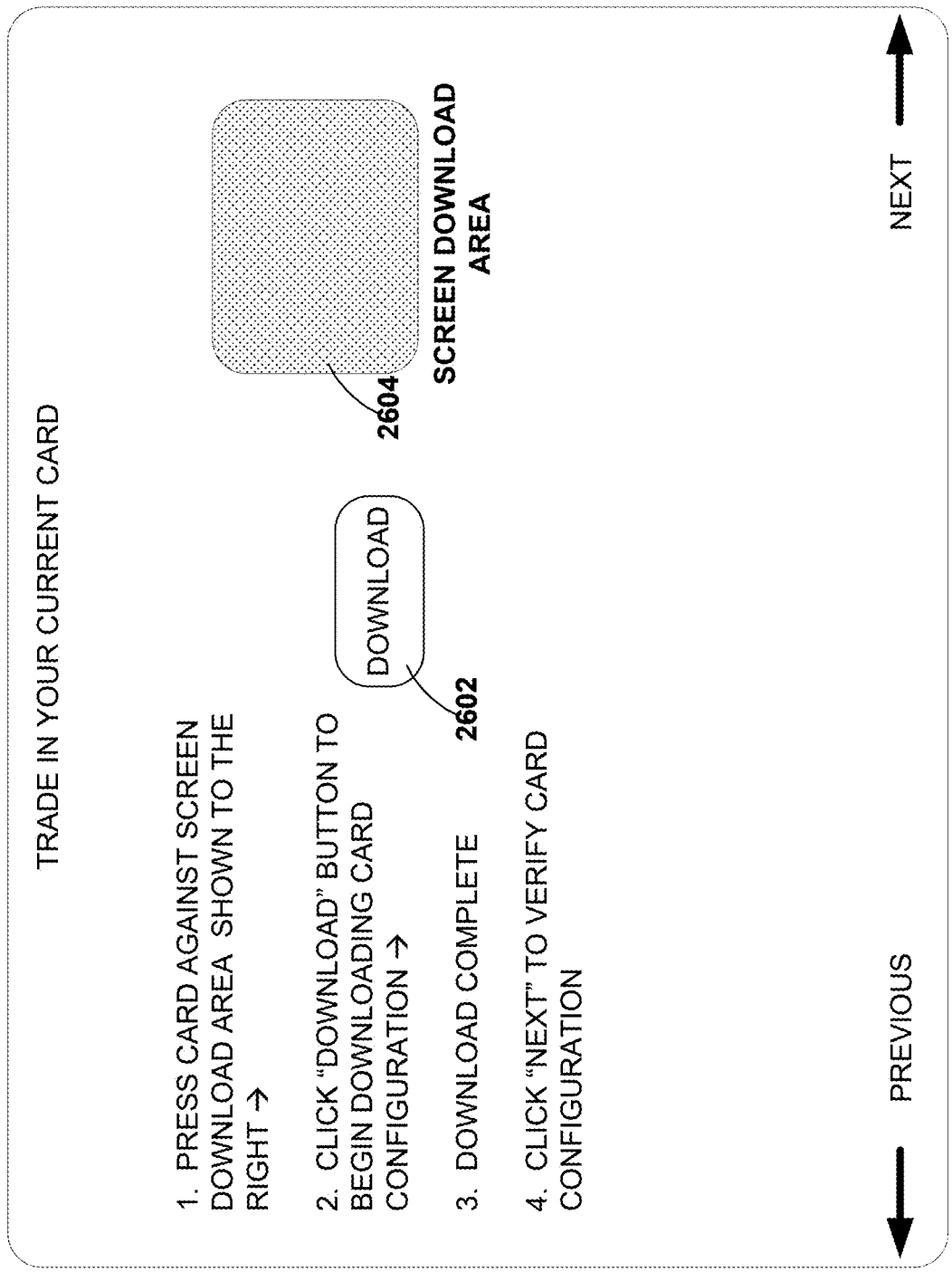
FIG. 26 is an illustration of display screens constructed in accordance with the principles of the present invention.

FIG. 25 shows GUI 2500. GUI 2500 may be rendered onto a display of a kiosk by a processor implemented within the kiosk. A processor may be executing application code (e.g., GUI application code) that is effective to display GUI 2500 that may include command section 2502 that displays a command (e.g., "TRADE IN YOUR CURRENT CARD").

Accordingly, for example, users wishing to discard their current card for a new card may do so at a kiosk. In order for a kiosk to determine a configuration of the user's current card, a user may select a scan method (e.g., screen download) via scroll list 2504 that may be used to interrogate the user's current card for configuration information before being discarded.

GUI 2600 may be used to download a configuration of a user's current card into a kiosk. For example, a user's current card may be equipped with touch simulation electronics that may simulate a human touch. Accordingly, GUI 2600 may prompt a user to press his or her current card against screen download area 2604 to transmit information to the kiosk as a series of simulated touches. As a result, information indicative of the configuration of the user's current card may be communicated to the kiosk via, for example, a touch-sensitive area, such as screen download area 2604.

Figure 27:
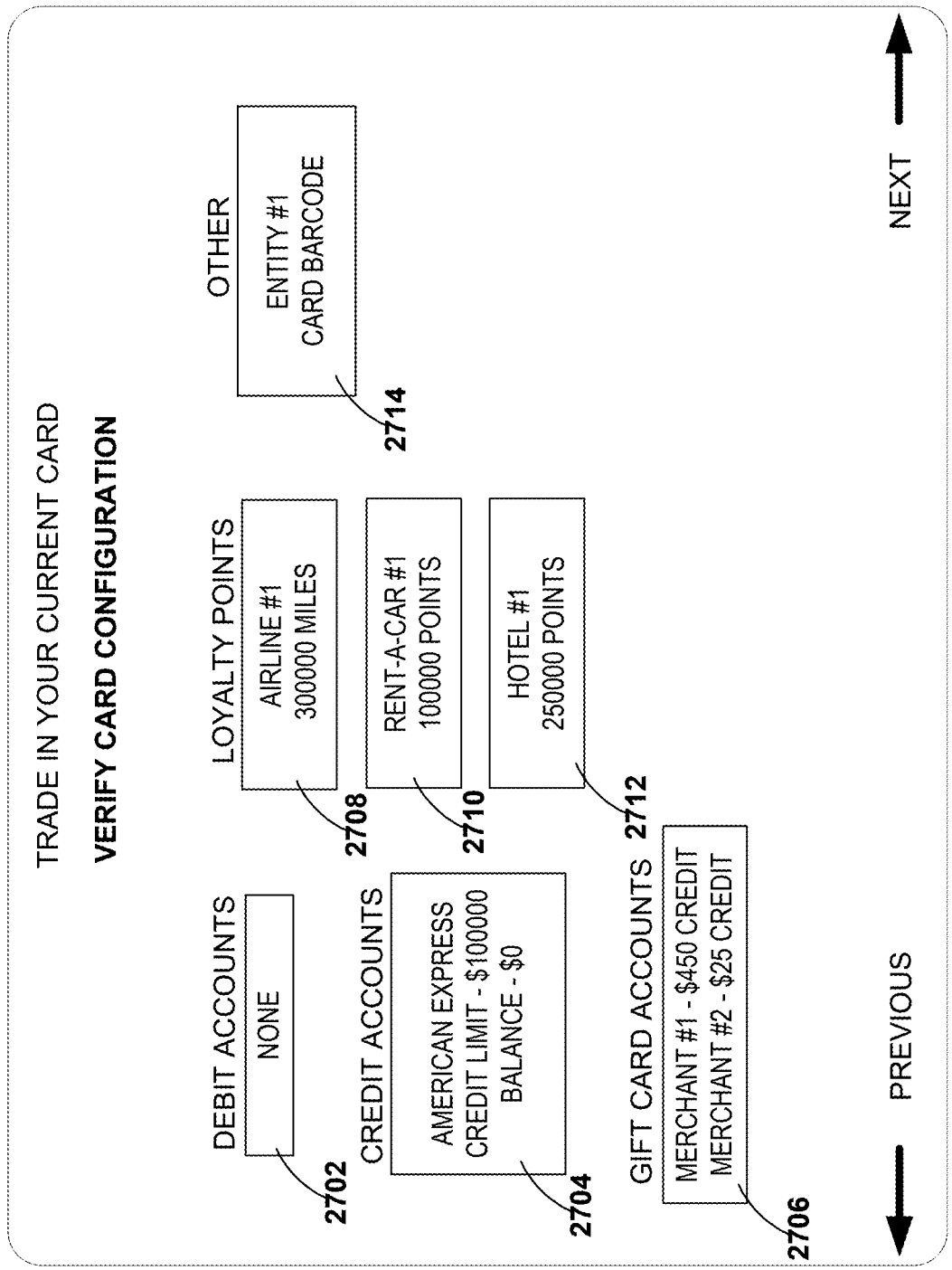
FIG. 27 is an illustration of display screens constructed in accordance with the principles of the present invention.

FIG. 27 shows GUI 2700 that may be used to monitor a current configuration of a user's current card. For example, a user's current card may be interrogated by a kiosk to determine which, if any, products may be associated with the user's current card. Accordingly, GUI 2700 may provide information relating to products (e.g., debit accounts 2702, credit accounts 2704, and gift card accounts 2706) that may be associated with the user's current card. Products (e.g., loyalty reward accounts 2708-2712) may be associated with a user's current account and may be additionally reported by GUI 2700. A user's current card may also implement hardware (e.g., a display that may be configured to display a barcode) that may be associated with an additional product (e.g., member's advantage account 2714).

FIG. 28 shows GUI 2800 that may be used to determine which products (e.g., credit accounts 2802, gift card accounts 2804, and loyalty points 2806), if any, a user may wish to transfer from his or her current card to a new card. A user may not wish to re-associate a product (e.g., a credit account) with a new card. Accordingly, for example, a kiosk may request that the associated financial institution automatically close the credit account that is no longer required by the user.

Other products (e.g., gift card accounts) may also be re-associated with a new card per the user's direction. Should a user decline such a re-association, the kiosk may access the user's on-line account that may be associated with the user's gift card accounts. In doing so, a user's on-line account may be credited with the gift card account balances. A kiosk may dispense cash, for example, for any products (e.g., loyalty points) that a user may not wish to re-associate with a new card. If no cash is required, a kiosk may instead credit a user's on-line loyalty account with the loyalty points.

FIG. 29 shows GUI 2900 that may be used to confirm which products, if any, a user may wish to transfer from his or her current card to a new card. A user may be instructed to surrender his or her current card upon confirmation by the user as to the transfer activities displayed by GUI 2900. Accordingly, for example, a user may deposit his or her current card into a discard slot as may be provided by a kiosk. A new card may then be dispensed to the user from the kiosk, the new card having all transferred accounts being associated with it.

Persons of ordinary skill will appreciate that any of the aforementioned GUIs may instead be rendered onto a display of a device (e.g., a computer) that may be connected to, for example, a card development server via a network (e.g., the internet). Such a server may provide card development code that may be executed by a processor within the computer to aid the user in card development activities as discussed herein that may be performed at locations that are remote to a kiosk.

Figure 30:
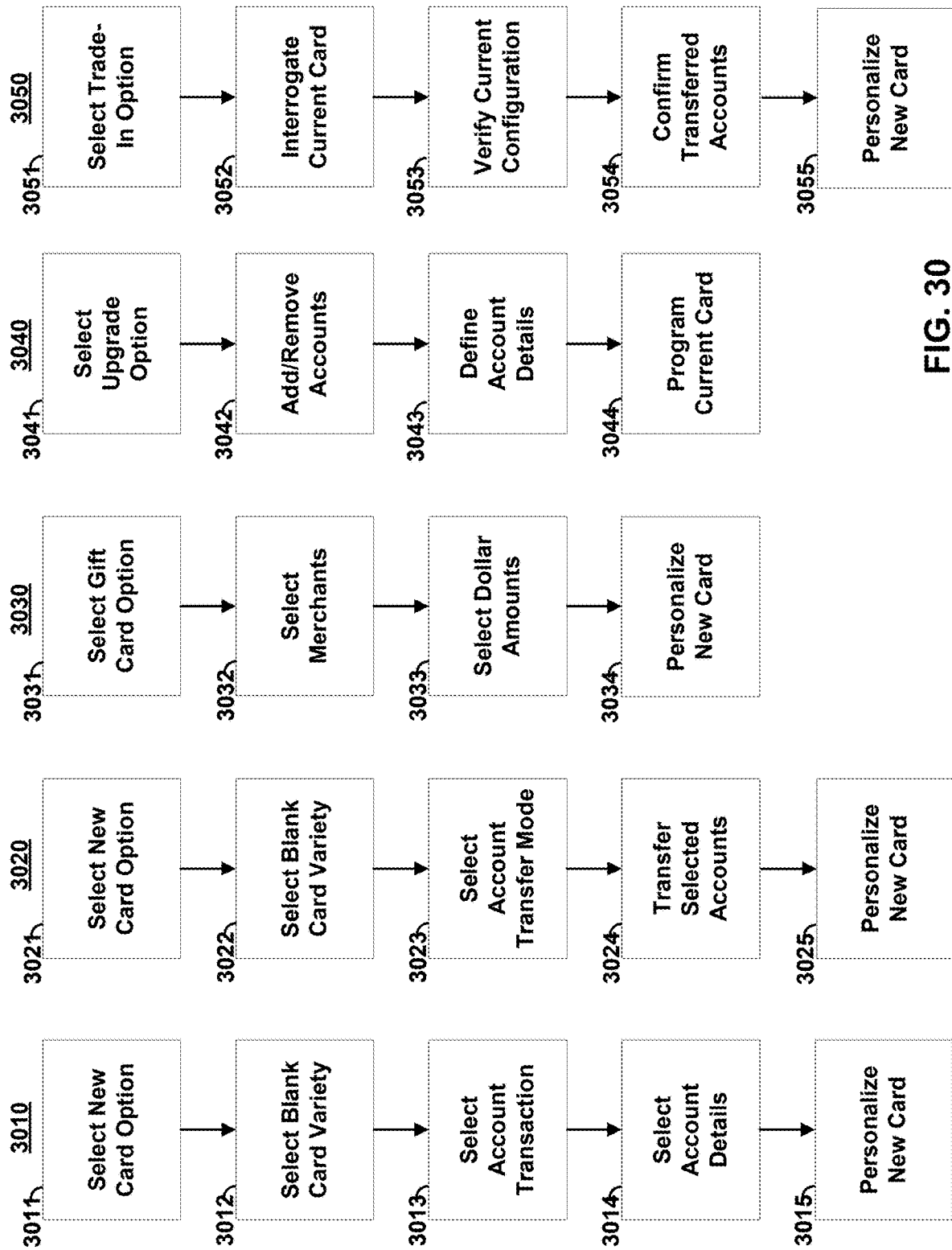
FIG. 30 is a flow chart of processes constructed in accordance with the principles of the present invention.

FIG. 30 shows flow charts 3010 through 3050. Sequence 3010 may include, for example, selection by a user that a new card is required (e.g., step 3011). Such a new card may ultimately be dispensed by a kiosk that a user may be interacting with. A user may select (e.g., step 3012) a card variety (e.g., a blank card having a predetermined hardware configuration) and may apply account transactions (e.g., step 3013) that may be associated with the blank card. For example, a user may wish to associate one or more products (e.g., credit or debit accounts) with a new card and may wish to associate usage of such accounts with manual inputs to the new card (e.g., button presses). Selection of account details (e.g., step 3014) may also be executed so that details of each product (e.g., credit limit and interest rate) may be further associated with each new product. Approval for each product associated with the new card may then be followed by a personalization event (e.g., step 3015). Accordingly, for example, a user may be given the opportunity to apply aesthetic features to the new card before the card is dispensed to the user from the kiosk.

Sequence 3020 may include, for example, selection by a user that a new card is required (e.g., step 3021). Such a new card may ultimately be dispensed by a kiosk that a user may be interacting with. A user may select (e.g., step 3022) a card variety (e.g., a blank card having a predetermined hardware configuration) and may apply account transactions (e.g., step 3024) that may be associated with the blank card. For example, a user may wish to transfer one or more products (e.g., credit, gift, and debit accounts) that may be associated with a user's current card. An account transfer mode (e.g., step 3023) may be selected to determine which of several transfer modes are to be executed. For example, data may be transferred from a user's current card to a kiosk using any number of transfer methods (e.g., electromagnetic data transfer, RFID data transfer, EMV chip transfer, infrared, and touch simulation transfer). A kiosk may also contact, for example, a financial institution associated with the transferred products in order to determine any and all information that may be necessary to complete the transfer. A user may be given the opportunity to apply aesthetic features to the new card (e.g., step 3025) before the card is dispensed to the user from the kiosk.

Sequence 3030 may include, for example, selection by a user that a new gift card is required (e.g., step 3031). Such a new gift card may ultimately be dispensed by a kiosk that a user may be interacting with. A user may select a card variety (e.g., a blank card having a predetermined hardware configuration) and may associate selected merchant accounts and dollar amounts (e.g., steps 3032-3033) with the new gift card. A user may be given the opportunity to apply aesthetic features to the new gift card (e.g., step 3034) before the new gift card is dispensed to the user from the kiosk.

Sequence 3040 may include, for example, selection by a user that a user's current card is to be upgraded (e.g., step 3041). A user may present his or her current card to a kiosk for interrogation, which may result in a listing of products (e.g., to be displayed on a display of a kiosk) that may be associated with a user's current card. A user may add or remove accounts from the listing of accounts (e.g., step 3042) and may define account details (e.g., step 3043) for such accounts. A user's current card may then be reprogrammed by the kiosk (e.g., step 3044) to provide the user's current card with upgraded functionality.

Sequence 3050 may include, for example, selection by a user that a user's current card is to be discarded (e.g., step 3051). A user may present his or her current card to a kiosk for interrogation (e.g., step 3052), which may result in a listing of products (e.g., to be displayed on a display of a kiosk) that may be associated with a user's current card. A user may verify accounts from the listing of accounts (e.g., step 3053) and may confirm account details (e.g., step 3054) for such accounts. A blank card may then be retrieved from within the kiosk and programmed with the products associated with the user's card that are to be transferred. A user may be given the opportunity to apply aesthetic features to the new card (e.g., step 3055) before the new card is dispensed to the user from the kiosk.

Persons skilled in the art will also appreciate that the present invention is not limited to only the embodiments described. Instead, the present invention more generally involves dynamic information. Persons skilled in the art will also appreciate that the apparatus of the present invention may be implemented in ways other than those described herein. All such modifications are within the scope of the present invention, which is limited only by the claims that follow.

What is claimed is:

1. A vending machine comprising:
   a plurality of battery-powered devices having a plurality of different hardware configurations, wherein at least one of said plurality of different hardware configurations comprises a display and a battery, and at least one of the plurality of different hardware configurations lacks a display;
   a vending machine display for providing one or more graphical user interfaces including,
   a rendered virtual device that is representative of one of said plurality of battery-powered devices, a rendered list of attributes to be selected for association with said virtual device, wherein said attributes include at least one functional feature associated with a hardware configuration selected from said plurality of different hardware configurations; and
   a manual interface for receiving user identification information; and
   a personalization device operable to apply said selected attributed to said one of said plurality of battered-powered devices, including configuring a selected functional feature based on the selected hardware configuration;
   store at least a portion of said user identification information on said one of said plurality of battery-powered devices prior to delivery from said vending machine as electronic data; and
   provide said user identification information as human-perceivable indicia on a surface of said one of said plurality of battery-powered devices.

2. The vending machine of claim 1, wherein said selected attributes include a graphical image.

3. The vending machine of claim 1, wherein said selected attributes include a holographic image.

4. The vending machine of claim 1, wherein said vending machine is coupled to a network and said selected attributes include a graphical image downloaded from said network.

5. The vending machine of claim 1, wherein said machine is coupled to a network and said selected attributes include a holographic image downloaded from said network.

6. The vending machine of claim 1, wherein said selected attributes include a background color.

7. The vending machine of claim 1, wherein said selected attributes include a background pattern.

8. The vending machine of claim 1, wherein said selected attributes include indicia associated with said user.

9. The vending machine of claim 1, wherein at least one of said different hardware configurations includes a button and said selected attributes include indicia associated with a function of said button.

10. The vending machine of claim 1, wherein said selected attributes include a signature panel and associated dimensions of said signature panel.

11. The vending machine of claim 1, wherein said selected attributes include textual information.

12. A system comprising:
a vending machine having a display, wherein a device type is selected from a plurality of device types displayed onto a graphical user interface of said display of said vending machine
said plurality of device types comprises at least two different hardware configurations, one of which includes a display and a battery and another that lacks a display;
customer identification information is received by said vending machine through a graphical user interface; and
a personalizing component that personalizes at least a physical device contained within said vending machine based on said selected attributes,
programs at least at first portion of said customer identification information into a memory of said physical device and
applies at least a second portion of said customer identification information as human-perceivable indicia on said physical device, wherein said first portion and second portion may be the same customer identification information, and
wherein said vending machine is operable to deliver said physical device from said vending machine, wherein at least one of said plurality of device types includes a display configured to render visual data based on said stored customer identification information.

13. The system of claim 12, wherein said selected attributes are aesthetic attributes and said personalizing includes printing said selected attributes onto a surface of said physical device.

14. A system comprising:
a vending machine including
a display operable to display at least one graphical user interface, said at least one graphical user interface being operable to
receive customer identification information and render a virtual device that is representative of a physical device associated with one or more products, wherein said virtual device corresponds to a selected hardware configuration;
render a virtual device that is representative of a physical device associated with one or more products, wherein said virtual device corresponds to a selected hardware configuration;
render a list of attribute definitions for association with said virtual device, said attribute definitions including selection of at least one functional feature of said physical device; and
render a list of said one or more products associated with said virtual device,
a programmer and a human-perceivable information applicator wherein said programmer:
configures said selected hardware configuration by activating at least one functional feature of said physical device;
stores at least a first portion of said received customer identification information in memory of said physical device; and
applies at least a second portion of said received customer identification information as human-perceivable indicia on said physical device, wherein said first portion and second portion may be the same received customer information; and
a dispensing mechanism configured to provide said physical device from said vending machine upon completion of personalization.

15. The system of claim 14, wherein said vending machine is operable to receive a customer credit application, communicate said customer credit application to a remote system, and receive results of said customer credit application.

16. The system of claim 14, wherein said attribute definitions include hardware configuration definitions.

17. The system of claim 14, wherein said attribute definitions include hardware configuration definitions.

18. The system of claim 14, wherein said device is coupled to a network, wherein said attribute definitions are communicated by said vending machine via said network.

19. A vending machine comprising:
a vending machine display for:
selecting a device type from a plurality of device types displayed onto at least one graphical user interface, wherein at least two of said plurality of device types includes a different hardware configuration, a first one of said different hardware configurations includes a display and battery a second one of said different hardware configurations does not include a device display;
selecting attributes to be associated with said selected device type from a plurality of attributes;
personalizing a physical device contained within said vending machine based on said selected attributes, storing customer identification information on said physical device, and human perceivable customer identification information is provided on said physical device; and
delivering said self-powered physical device.

20. A method comprising:
selecting a device type from a plurality of device types displayed onto a graphical user interface of a vending machine;
selecting attributes to be associated with said selected device type from a plurality of attributes displayed onto said graphical user interface;
personalizing a physical device contained within said vending machine based on said selected attributes; and
delivering said physical device from said vending machine,
wherein said selected attributes are functional attributes and said personalizing includes programming said selected attributes into a memory of said physical device by an infrared programming device of said vending machine.

21. A vending machine comprising:
a plurality of battery-powered devices having different hardware configurations; wherein at least one of said different hardware configurations includes a display and at least another of said different hardware configurations lacks a display;

a human perceivable indicia application device configured to apply user identification information as visible indicia on said battery-powered device;

a personalization device operable to render a plurality of graphical user interfaces including, a virtual device that is representative of one of said plurality of battery-powered devices; and a list of attributes to be selected for association with said virtual device, said selected attributes being rendered onto said virtual device, and wherein said attributes include at least one functional feature that defines an operational characteristic of said device;

apply said selected attributes to said one of said plurality of battery-powered devices prior to delivery from said vending machine, wherein said attributes define at least one hardware-based functional feature;

program at least a portion of user identification into a memory of said battery-powered device; and a dispensing mechanism operable to provide said battery-powered device from said vending machine after completion of personalization.

22. A vending machine comprising:

a plurality of battery-powered devices having different hardware configurations, wherein at least one of said different hardware configurations comprises a display, a battery, a plurality of manual interfaces, and an RFID component;

a human-perceivable indicia application device configured to apply user identification information as visible indicia on said battery-powered device;

a personalization device operable to:

render a plurality of graphical user interfaces comprising:

a virtual device that is representative of one of said plurality of battery-powered devices;

a list of attributes to be selected for association with said virtual device, said selected attributes being rendered onto said virtual device;

apply said selected attributes to said one of said plurality of battery-powered devices prior to delivery from said vending machine, wherein said attributes define at least one hardware-based functional feature; and program at least a portion of user identification information into a memory of said battery-powered device; and a dispensing mechanism operable to provide said battery-powered device from said vending machine after completion of personalization.

* * * * *